United States Patent
Yamashita

(10) Patent No.: US 8,421,915 B2
(45) Date of Patent: Apr. 16, 2013

(54) HD SIGNAL TRANSMITTING DEVICE, HD SIGNAL TRANSMITTING METHOD, HD SIGNAL RECEIVING DEVICE, AND SIGNAL RECEIVING METHOD USING A CONVENTIONAL INTERFACE

(75) Inventor: Shigeyuki Yamashita, Kanagawa (JP)

(73) Assignee: Sony Corporation, Tokyo (JP)

(*) Notice: Subject to any disclaimer, the term of this patent is extended or adjusted under 35 U.S.C. 154(b) by 424 days.

(21) Appl. No.: 12/601,126

(22) PCT Filed: Nov. 11, 2008

(86) PCT No.: PCT/JP2008/070472
§ 371 (c)(1),
(2), (4) Date: Nov. 20, 2009

(87) PCT Pub. No.: WO2009/066582
PCT Pub. Date: May 28, 2009

(65) Prior Publication Data
US 2010/0149412 A1    Jun. 17, 2010

(30) Foreign Application Priority Data
Nov. 22, 2007 (JP) ................. P2007-303628

(51) Int. Cl.
*H04N 7/14* (2006.01)
*H04N 5/225* (2006.01)
*H04N 7/12* (2006.01)

(52) U.S. Cl.
USPC .......... 348/426.1; 348/218.1; 348/387.1; 348/14.12

(58) Field of Classification Search ........... 348/218.1, 348/385.1–387.1, 426.1–428.1, 430.1, 715, 348/716, 14.12, 14.13; 382/293, 294, 299, 382/304
See application file for complete search history.

(56) References Cited

U.S. PATENT DOCUMENTS

| | | | | | |
|---|---|---|---|---|---|
| 2,940,005 | A | * | 6/1960 | Toulon | 315/375 |
| 4,472,732 | A | * | 9/1984 | Bennett et al. | 348/452 |
| 4,520,396 | A | * | 5/1985 | Dischert et al. | 348/613 |
| 4,654,484 | A | * | 3/1987 | Reiffel et al. | 348/14.13 |
| 4,660,096 | A | * | 4/1987 | Arlan et al. | 386/326 |
| 4,903,125 | A | * | 2/1990 | Parker | 375/240.01 |
| 5,392,071 | A | * | 2/1995 | Richards et al. | 375/240.11 |
| 5,430,486 | A | * | 7/1995 | Fraser et al. | 348/426.1 |

(Continued)

FOREIGN PATENT DOCUMENTS
EP    0 570 092    11/1993
EP    1 589 771    10/2005
(Continued)

OTHER PUBLICATIONS

SMPTE 372M-2002: Dual Link 292M Interface for 1920 × 1080 Picture Raster, XP008122300, Jun. 19, 2002, pp. 1-16.

*Primary Examiner* — Victor Kostak
(74) *Attorney, Agent, or Firm* — Frommer Lawrence & Haug LLP; William S. Frommer

(57) ABSTRACT

For example, samples included in a frame constituted by a 3840×2160/24P,25P,30P/4:4:4,4:2:2,4:2:0/10,12-bit signal are mapped into first to fourth sub-images specified in the HD-SDI format, in units of two adjoining samples. Thus, it is possible to transmit through a transmission constitution for the HD-SDI format. The signal can be converted into serial digital data permitting a bit rate of 10.692 Gbps or the like and transmitted, and the receiving side can accurately reproduce original data.

10 Claims, 18 Drawing Sheets

U.S. PATENT DOCUMENTS

| | | | |
|---|---|---|---|
| 5,978,035 A * | 11/1999 | Geshwind | 348/441 |
| 5,999,216 A * | 12/1999 | Kaars | 375/240.01 |
| 6,084,910 A * | 7/2000 | Stanger et al. | 375/240.03 |
| 6,094,457 A * | 7/2000 | Linzer et al. | 375/240.12 |
| 6,661,463 B1 * | 12/2003 | Geshwind | 348/384.1 |
| 6,674,796 B1 * | 1/2004 | Haskell et al. | 375/240.01 |
| 7,218,751 B2 * | 5/2007 | Reed et al. | 382/100 |
| 7,221,406 B2 * | 5/2007 | Yamashita | 348/469 |
| 7,463,816 B2 * | 12/2008 | Tseng et al. | 386/353 |
| 7,965,311 B2 * | 6/2011 | Oura | 348/38 |
| 2005/0281296 A1 | 12/2005 | Yamashita | |
| 2007/0200948 A1 * | 8/2007 | Kim et al. | 348/385.1 |
| 2007/0263937 A1 | 11/2007 | Rizko | |

FOREIGN PATENT DOCUMENTS

| | | |
|---|---|---|
| JP | 9 37241 | 2/1997 |
| JP | 2004 88272 | 3/2004 |
| JP | 2005 328494 | 11/2005 |
| JP | 2007 306539 | 11/2007 |
| WO | WO 2007/142785 | 12/2007 |

\* cited by examiner

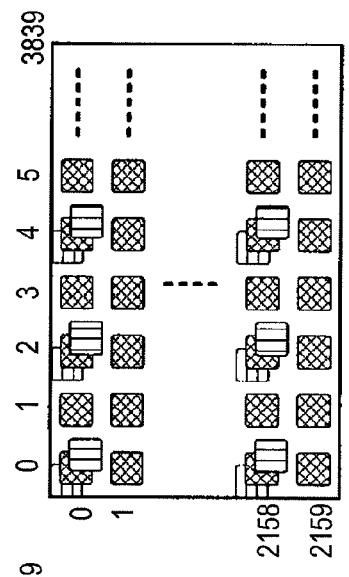
FIG. 3A
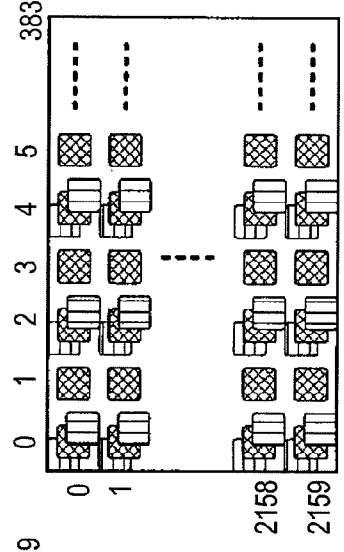
FIG. 3B
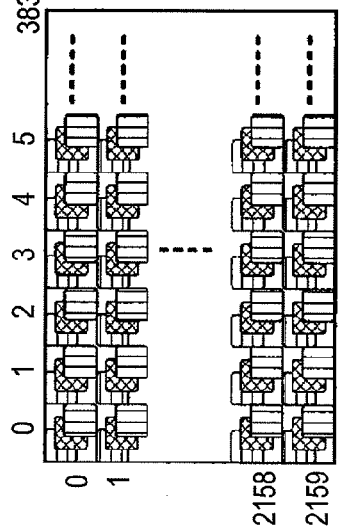
FIG. 3C

FIG. 9A
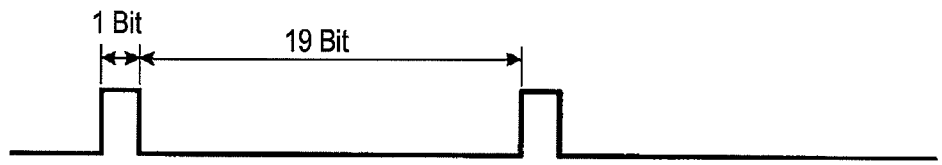
FIG. 9B
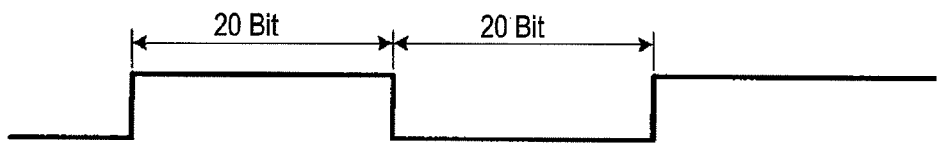
FIG. 10
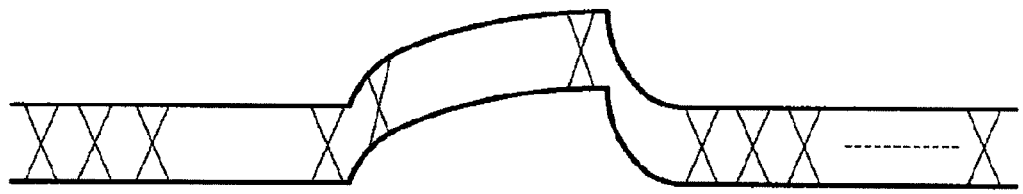
FIG. 11
| Word | 9 (MSB) | 8 | 7 | 6 | 5 | 4 | 3 | 2 | 1 | 0 (LSB) |
|---|---|---|---|---|---|---|---|---|---|---|
| XYZ | 1 | F | V | H | P3 | P2 | P1 | P0 | 0 | 0 |

HD SIGNAL TRANSMITTING DEVICE, HD SIGNAL TRANSMITTING METHOD, HD SIGNAL RECEIVING DEVICE, AND SIGNAL RECEIVING METHOD USING A CONVENTIONAL INTERFACE

TECHNICAL FIELD

The present invention relates to a signal transmitting device, signal transmitting method, a signal receiving device and a signal receiving method for serially transmitting an image signal, in which the number of pixels of one frame is larger than the number of pixels specified in the HD-SDI format.

BACKGROUND ART

Development of an image receiving system and an imaging system that handle an ultra-high-definition video signal which overwhelms a high-definition (HD) signal, that is, an existing image signal (video signal) in which one frame has 1920 samples on each of 1080 lines has made progress. For example, ultra-high-definition television (UHDTV) specifications that constitute a new-generation broadcasting method of handling four times or sixteen times larger the number of pixels than an existing HD broadcasting method have been proposed to or standardized by the International Telecommunication Union (ITU) or the Society of Motion Picture and Television Engineers (SMPTE). Video specifications having been proposed to the ITU or SMPTE describe a video signal of 3840 samples×2160 lines or 7680 samples×4320 lines that represents twice or four times larger the numbers of samples and lines than a signal of 1920 samples×1080 lines does. The specifications having been standardized by the ITU are called the large screen digital imagery (LSDI) standard, and the specifications having been proposed to the SMPTE are called the ultra-high-definition TV (UHDTV) standard. As for the UHDTV, signals listed in Table 1 below are specified.

TABLE 1

Image Sample Structure and Frame Rate of UHDTV System

| System category | System name | Luminance per effective line or Number of R'G'B' samples | Number of effective lines per frame | Frame rate (Hz) |
|---|---|---|---|---|
| UHDTV1 | 3840 × 2160/50/P | 3840 | 2160 | 50 |
|  | 3840 × 2160/59.94/P | 3840 | 2160 | 60/1.001 |
|  | 3840 × 2160/60/P | 3840 | 2160 | 60 |
| UHDTV2 | 7680 × 4320/50/P | 7680 | 4320 | 50 |
|  | 7680 × 4320/59.94/P | 7680 | 4320 | 60/1.001 |
|  | 7680 × 4320/60/P | 7680 | 4320 | 60 |

As an interface for the signals, a method of transmitting a video signal over a transmission line of a bit rate of 10 Gbps using two channels has been proposed for a video signal of 3840 samples/60 frames conformable to the UHDTV standard.

In a patent document 1, a technology for serially transmitting a 3840×2160/30P,30/1.001P/4:4:4/12-bit signal that is a kind of 4 k×2 k signal (an ultra-high-definition signal of 4 k samples×2 k lines) at a bit rate of 10 Gbps or more is disclosed. The wording of 3840×2160/30P refers to the number of pixels in a horizontal direction×the number of lines in a vertical direction/the number of frames per sec. The same applies to the remaining part of this description. Further, 4:4:4 refers to the ratio of a red signal R to a green signal G to a blue signal B in case of a primary-color signal transmission method, or refers to the ratio of a luminance signal Y to a first color-difference signal Cb to a second color-difference signal Cr incase of a color-difference signal transmission method.

Patent document 1: JP-A-2005-328494

DISCLOSURE OF THE INVENTION

However, in the SMPTE or ITU, frames of 3840 samples× 2160 lines or 7680 samples×4320 lines are standardized, but interfaces thereof are not standardized. Since an image signal of a transmission rate exceeding the HD-SDI format has an extremely large data volume, the image signal cannot be transmitted in real time by using only one channel of existing transmission system.

The present invention is intended to break through the foregoing situation. An object of the present invention is to satisfactorily transmit an ultra high-definition video signal exceeding the HD-SDI format in real time.

In order to solve the aforesaid problems, a signal transmitting device in accordance with the present invention is adapted to a signal transmitting device that transmits an input image signal, in which one frame includes a larger number of pixels than the number of pixels specified in the HD-SDI format.

As for the constitution, a mapping unit, a parallel-to-serial conversion unit, and a transmission unit are included.

The mapping unit thins out pixel samples, which are extracted from each frame of an input image signal in units of predetermined samples, fetches the thinned out samples in even order frame by frame, and maps the samples into active periods of first, second, third, and fourth sub-images conformable to the HD-SDI format. Further, the mapping unit separates each of the mapped first, second, third, and fourth sub-images into a first-link transmission channel and a second-link transmission channel, and thus maps the sub-images into eight channels.

The parallel-to-serial conversion unit serially converts the mapped first, second, third, and fourth sub-images.

An output unit outputs serial digital data which is serially converted by the parallel-to-serial conversion unit.

A signal transmitting method in accordance with the present invention is adapted to a signal transmitting method of transmitting an input image signal in which one frame has a larger number of pixels than the number of pixels specified in the HD-SDI format.

As for processing, mapping processing, parallel-to-serial conversion processing, and transmitting processing are carried out.

The mapping processing is to thin out pixel, which are extracted from each frame of an input image signal, in units of predetermined samples, fetch the thinned out samples in even order frame by frame, and map the samples into active periods of first, second, third, and fourth sub-images conformable to the HD-SDI format. Further, the mapping processing is to separate each of the mapped first, second, third, and fourth sub-images into a first-link transmission channel and a second-link transmission channel, and thus map the sub-images into eight channels.

The parallel-to-serial conversion processing is to serially convert the first, second, third, and fourth sub-images mapped through the mapping processing.

Output processing is to output serial digital data which is serially converted through the parallel-to-serial conversion processing.

Next, a signal receiving device in accordance with the present invention is adapted to a signal receiving device that receives an input image signal in which the number of pixels of one frame is larger than the number of pixels specified in the HD-SDI format.

As for the constitution, a receiving unit, and reproduction unit are included.

The receiving unit receives first, second, third, and fourth sub-images into which an image signal is mapped and each of which is divided into a first-link channel and a second-link channel.

The reproduction unit extracts two by two pixel samples allocated to active periods of first, second, third, and fourth sub-images received by the receiving unit, sequentially reallocates the pixel samples to one frame of the image signal, and restores thinned out pixels from the allocated samples.

A signal receiving method in accordance with the present invention is adapted to a signal receiving method of receiving an input image signal in which the number of pixels of one frame is larger than the number of pixels specified in the HD-SDI format.

As for processing, receiving processing and reproduction are carried out.

The receiving processing is to receive first, second, third, and fourth sub-images into which an image signal is mapped and each of which is divided into a first-link channel and a second-link channel.

The reproduction processing is to extract two by two pixel samples allocated to active periods of first, second, third, and fourth sub-images received by the receiving unit, sequentially reallocate the pixel samples to one frame of the image signal, and restore thinned out pixels from the allocated samples.

According to the present invention, each of pixel samples of an image signal in which the number of pixels of one frame is larger than the number of pixels specified in the HD-SDI format is mapped into channels having a serial digital video signal format conformable to the HD-SDI format. Thus, the signal can be converted into serial digital data permitting a bit rate of 10.692 Gbps or the like and transmitted, and the receiving side can accurately reproduce original data. Therefore, this is advantageous in that an ultra-high-definition video signal can be transmitted by using a conventional interface.

BRIEF DESCRIPTION OF THE DRAWINGS

FIG. 3A, FIG. 3B, and FIG. 3C are diagrams showing examples of a sample structure for one frame conformable to the UHDTV standard.

FIG. 9A and FIG. 9B are diagrams showing pathological patterns.

FIG. 10 is a diagram showing a warp of a base line in an AC-coupled transmission system.

FIG. 11 is a diagram showing an XYZ code in a timing reference signal SAV.

BEST MODE FOR CARRYING OUT THE INVENTION

Referring to FIG. 1 to FIG. 18, the first embodiment of the present invention will be described below.

Figure 1:
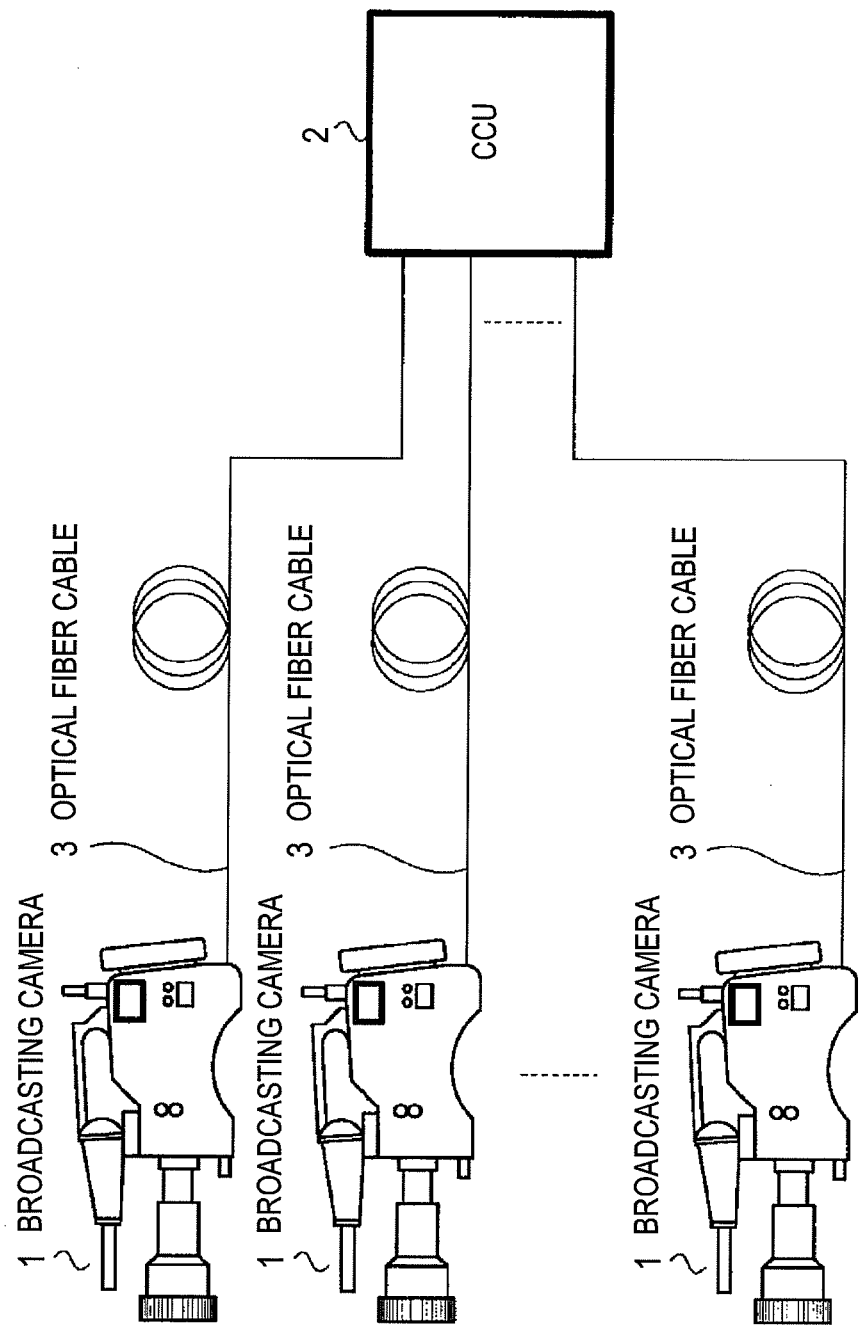
FIG. 1 is a diagram showing the overall constitution of a camera transmission system for television broadcasting stations in accordance with the first embodiment of the present invention.

FIG. 1 is a diagram showing an overall constitution of a camera transmission system for television broadcasting stations to which the present embodiment is adapted. The camera transmission system includes multiple broadcasting cameras 1 and a camera control unit (CCU) 2. The broadcasting cameras 1 are connected to the CCU 2 over optical fiber cables 3.

The broadcasting cameras 1 are cameras that share the same constitution and function as signal transmitting devices that produce and transmit as a 4 k×2 k signal (an ultra-highdefinition signal of 4 k samples×2 k lines) a 3840×2160/24P, 25P,30P/4:4:4,4:2:2,4:2:0/10,12-bit signal equivalent to an LSDI signal.

The CCU 2 is a unit that controls each of the broadcasting cameras 1, receives a video signal from each of the broadcasting camera 1, or transmits a video signal (return video) to be used to display on a monitor of each of the broadcasting camera 1 a picture which is being picked up by any other broadcasting camera 1. The CCU 2 functions as a signal receiving apparatus that receives a video signal from each of the broadcasting cameras 1.

Figure 2:
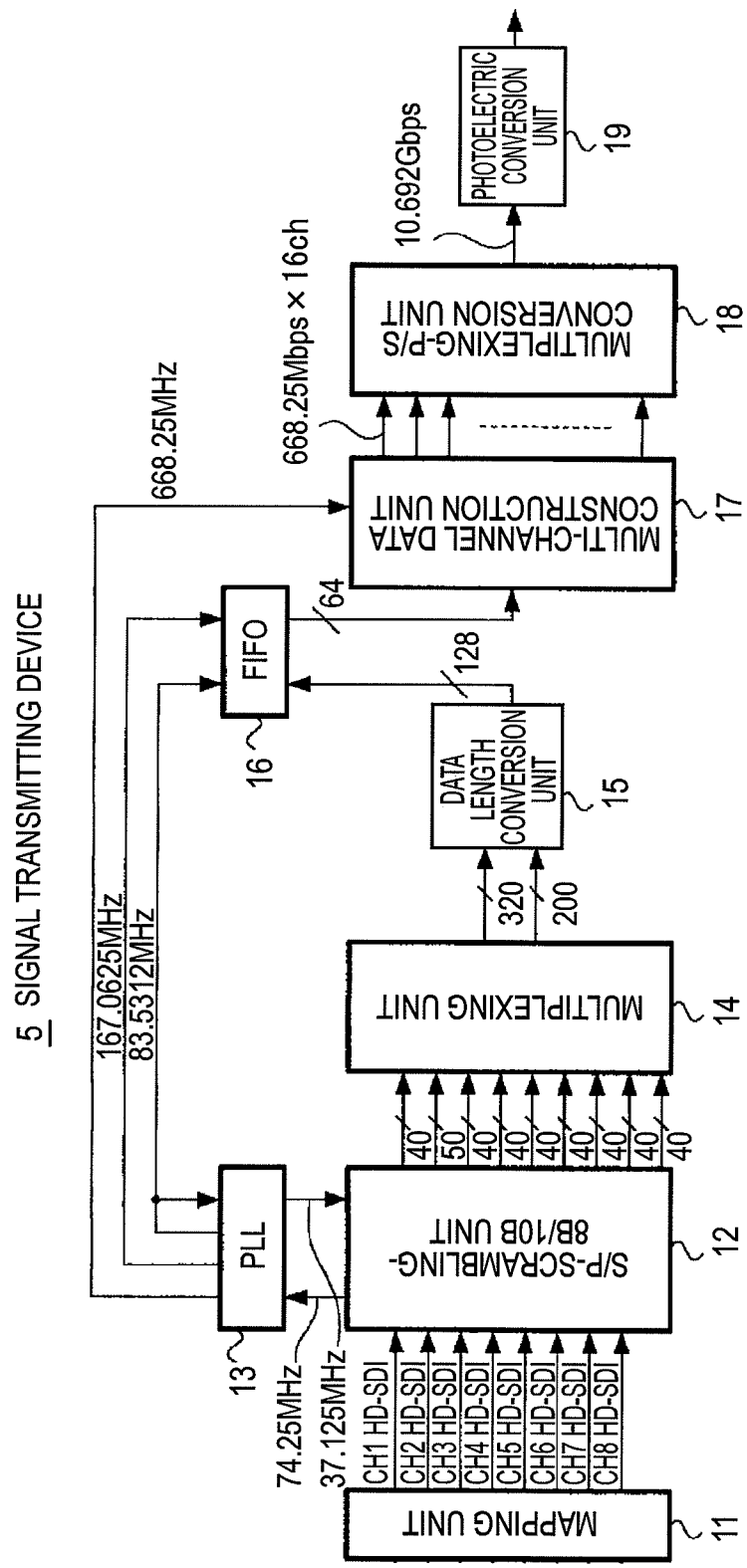
FIG. 2 is a block diagram showing an example of an internal constitution of a signal transmitting device out of the circuitry of a broadcasting camera.

FIG. 2 is a block diagram showing a portion of the circuitry of the broadcasting camera 1 relating to the present embodiment. A 3840×2160/24P,25P,30P/4:4:4,4:2:2,4:2:0/10,12-bit signal produced by an imaging unit and a video signal processing unit (not shown) incorporated in the broadcasting camera 1 is transmitted to a mapping unit 11.

A 3840×2160/24P,25P,30P/4:4:4,4:2:2,4:2:0/10,12-bit signal is a signal of 36 bits wide having a green (G) data stream, a blue (B) data stream, and a red (R) data stream, each of which has a word length of 12 bits, synchronized and juxtaposed. One frame period is any of $\frac{1}{24}$ sec, $\frac{1}{25}$ sec, and $\frac{1}{30}$ sec, and an effective line period for 2160 lines is included in the one frame period.

Within each effective line period, a timing reference signal EAV (end of active video), a line number LN, an error detection code CRC, a horizontal blanking period (an interval for an auxiliary data space or undefined word data), a timing reference signal SAV (start of active video), and an active line representing an interval for video data are arranged. The number of samples on the active line is 3840. To the active line of a G data stream, a B data stream, or an R data stream, G, B, or R video data is allocated.

FIG. 3A, FIG. 3B, and FIG. 3C are explanatory diagrams showing examples of sample structures specified in the UHDTV standard. A frame employed in a description to be made in conjunction with FIG. 3A to FIG. 3C is a frame formed with 3840 samples×2160 samples (hereinafter may be called a frame of a 4 k×2 k signal).

The sample structures specified in the UHDTV standard include three kinds of structures described below. Incidentally, in the SMPTE standard, a signal denoted by a symbol with a dash such as R', G', or B' is a signal having undergone gamma correction or the like.

FIG. 3A shows an example employed in a R'G'B',Y'Cb'Cr', 4:4:4 system. In this system, all samples contain R, G, and B components or Y, Cb, and Cr components.

FIG. 3B shows an example employed in a Y'Cb'Cr', 4:2:2 system. In this system, even-numbered samples contain Y, Cb, and Cr components, and odd-numbered samples contain a Y component.

FIG. 3C shows an example employed in a Y'Cb'Cr', 4:2:0 system. In this system, even-numbered samples contain Y, Cb, and Cr components, and odd-numbered samples contain a Y component. Further, the Y component (having Cb and Cr components thinned out) is contained on odd-numbered lines.

Figure 4:
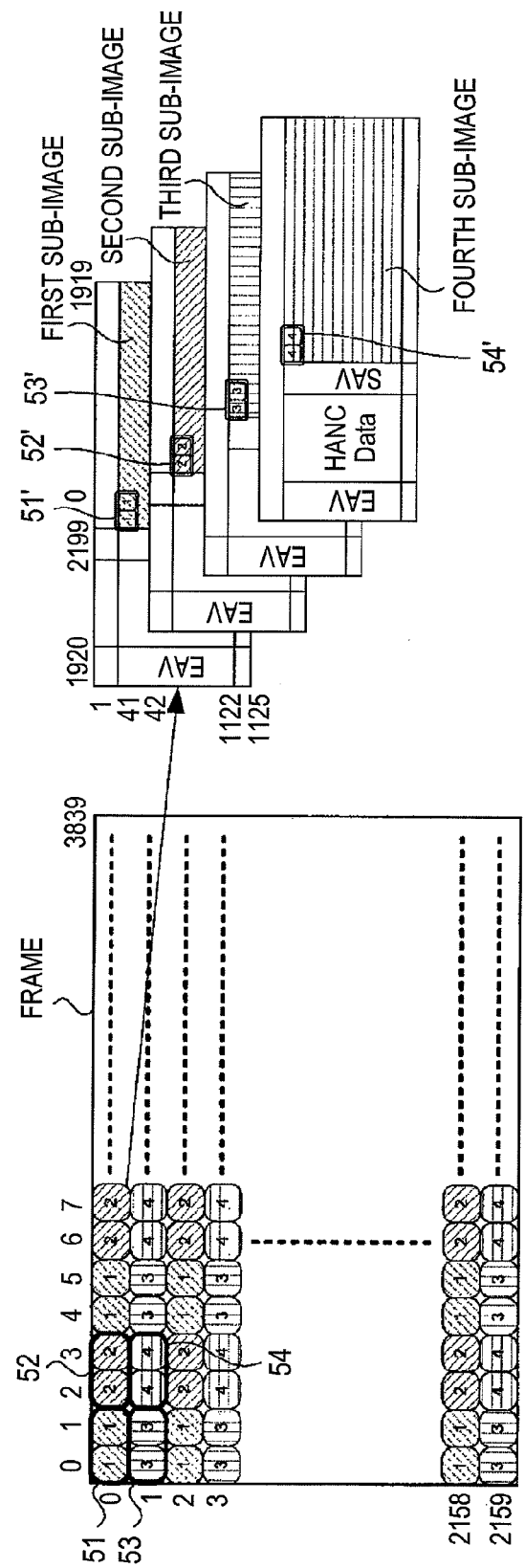
FIG. 4 is an explanatory diagram showing an example in which samples contained in one frame of a 4 k×2 k signal are mapped into first to fourth sub-images.

FIG. 4 is an explanatory diagram showing an example in which samples constituting a frame of a 4 k×2 k signal are mapped into first to fourth sub-images by the mapping unit 11. Herein, the mapping unit 11 thins out pixel samples, which are extracted from each frame of an input video signal, in units of predetermined samples. In this example, two adjoining samples on the same line are thinned out. The mapping unit 11 fetches the thinned out samples in even order frame by frame, and maps them into active periods of the first, second, third, and fourth sub-images conformable to the HD-SDI format.

At this time, characteristically, the mapping unit 11 maps two samples on an odd-numbered line in each of frames alternately to the first sub-image and second sub-image, and maps two samples on an even-numbered line in each of the frames alternately to the third sub-image and fourth sub-image.

As a result, samples constituting one frame of a 2 k×1 k signal are mapped into the first to fourth sub-images that is arisen in the active period defined in the HD-SDI format.

Further, the mapping unit 11 separates each of the mapped first, second, third, and fourth sub-images into a first-link transmission channel (LinkA) and a second-link transmission channel (LinkB), and thus maps the sub-images to eight channels.

The mapping unit 11 is a circuit that maps a frame, which is formed with a 3840×2160/24P,25P,30P/4:4:4,4:2:2,4:2:0/10,12-bit image signal, into HD-SDI signals on channels CH1 to CH8 (eight channels of channels CH1, CH3, CH5, and CH7 belonging to a link LinkA, and channels CH2, CH4, CH6, and CH8 belonging to a link LinkB), which permit a bit rate of 1.485 Gbps or 1.485 Gbps/1.001 (hereinafter, simply, 1.485 Gbps), in conformity with the SMPTE435.

The mapping unit 11 in this example maps an image signal, which is extracted from a frame formed with 3840 samples and 2160 lines, into first to fourth sub-images, and maps the image signal, which is mapped into the first to fourth sub-images, into HD-SDI signals on eight channels CH1 to CH8 permitting a bit rate of 1.485 Gbps.

As shown in FIG. 4, a frame formed with a 4 k×2 k signal includes multiple samples. Herein, the position of each of samples in a frame is expressed as (sample number, line number).

A first sample group 51 including two adjoining samples at positions (0,0) and (1,0) on the 0th line is mapped into positions (0,42) and (1,42) in the first sub-image and indicated as a first sample group 51'.

A second sample group 52 including two adjoining samples at positions (2,0) and (3,0) on the 0th line is mapped into positions (0,42) and (1,42) in the second sub-image and indicated as a second sample group 52'.

A third sample group 53 including two adjoining samples at positions (0,1) and (1,1) on the first line is mapped into positions (0,42) and (1,42) in the third sub-image and indicated as a third sample group 53'.

A fourth sample group 54 including two adjoining samples at positions (2,1) and (3,1) on the first line is mapped into positions (0,42) and (1,42) in the fourth sub-image and indicated as a fourth sample group 54'.

Figure 5:
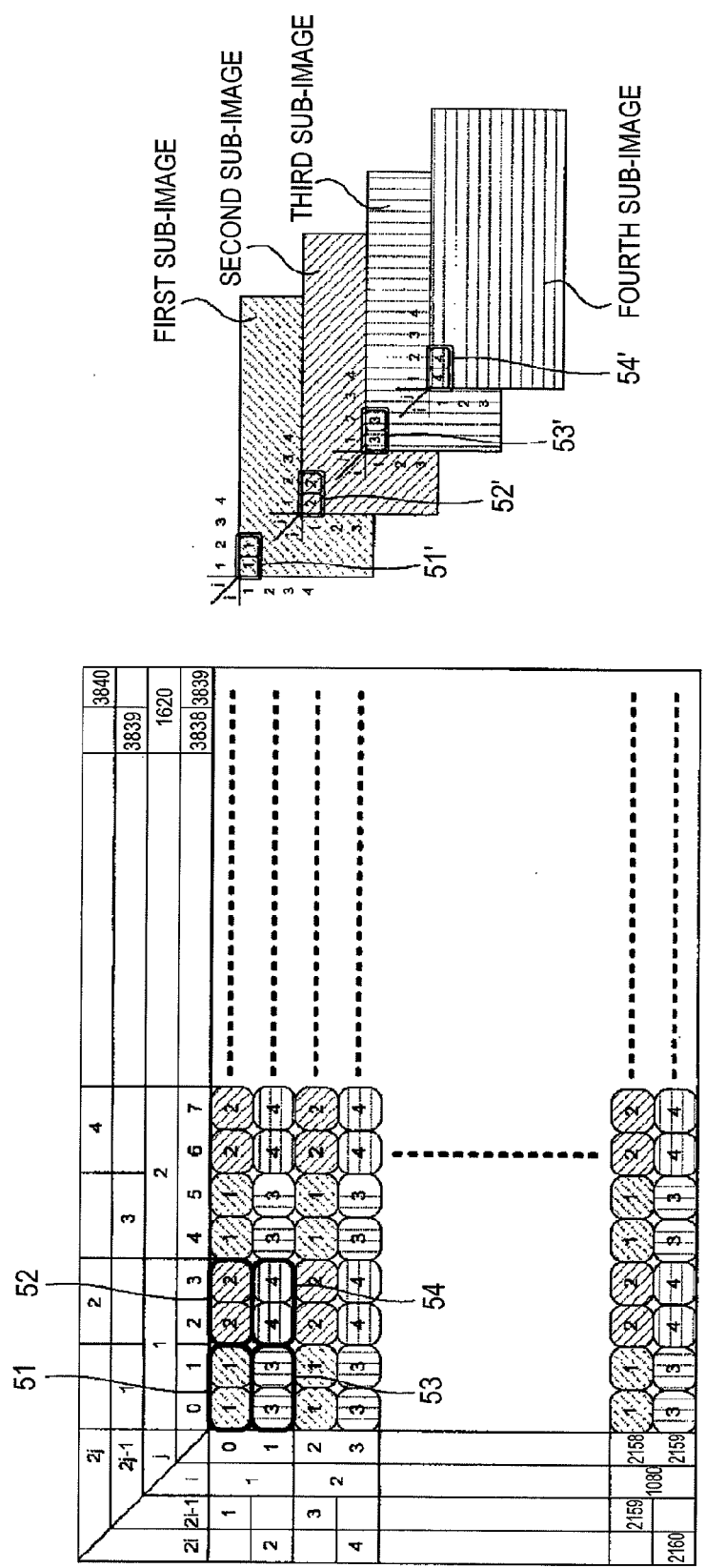
FIG. 5 is an explanatory diagram showing an example in which samples contained in one frame of a 4 k×2 k signal are mapped into first to fourth sub-images.

Referring to FIG. 5, a concrete example of mapping will be described below on the assumption that a position of each of samples included in a frame of a 4 k×2 k signal or each of the first to fourth sub-images is expressed as (sample number, line number). Referring to FIG. 5, an example in which the first to fourth sub-images are extracted and mapped will be described below.

As shown in FIG. 5, to one frame of a 4 k×2 k signal, i, 2i, and 2i−1 values are assigned in a line direction, and j, 2j, and 2j−1 values are assigned in a sample direction.

To the first to fourth sub-images, i values are assigned in the line direction, and j values are assigned in the sample direction.

Assuming that two samples adjoining on the same line are regarded as a sample group, the mapping unit 11 maps a first sample group, which is located at the 2j−1-th (where j denotes a natural number) sample group position on the 2i–1-th (where i denotes a natural number) line in a frame, into the j-th sample group position on the i-th line in the first sub-image.

The mapping unit 11 maps a second sample group, which is located at the 2j-th sample group position on the 2i–1-th line in the frame, into the j-th sample group position on the i-th line in the second sub-image.

The mapping unit 11 maps a third sample group, which is located at the 2j–1-th sample group position on the 2i-th line in the frame, into the j-th sample group position on the i-th line in the third sub-image.

The mapping unit 11 maps a fourth sample group, which is located at the 2j-th sample group position on the 2i-th line in the frame, into the j-th sample group position on the i-th line in the fourth sub-image.

A reason why samples are mapped as mentioned above will be described below.

A frame is constructed according to any of the RGB, YCbCr/4:4:4 mode, YCbCr/4:2:2 mode, or YCbCr/4:2:0 mode.

If a frame can be transmitted over a single HD-SDI cable, no problem would occur. However, since an amount of data increases, it is impossible to transmit the frame over the single HD-SDI cable. Therefore, samples of the frame (information including an image signal) are appropriately extracted and transmitted in the form of multiple sub-images.

As shown in FIG. 3A, if a frame is constructed in the RGB-or-YCbCr-and-4:4:4 mode, whichever of samples are extracted, an original image can be reproduced.

As shown in FIG. 3B, if a frame is constructed in the YCbCr/4:2:2, odd-numbered samples contain only information Y on a luminance signal. Therefore, each of the odd-numbered samples is mapped together with an adjoining even-numbered sample (including CbCr) into a sub-image. Thus, an image can be directly reproduced from the sub-image, though the resolution of the original image of the frame is degraded.

As shown in FIG. 3C, if a frame is constructed in the YCbCr/4:2:0, odd-numbered samples contain only information Y on a luminance signal. Further, only the information Y on the luminance signal is contained in odd-numbered lines. Therefore, each of the odd-numbered samples is mapped together with an adjoining even-numbered sample (including CbCr) into a sub-image. Thus, an image can be reproduced directly from the sub-image, though the resolution of the original image of the frame is degraded. Only the information Y on the luminance signal is contained in the third and fourth sub-images. For checking an image to be reproduced, an image representing luminance values alone poses no problem.

When samples are mapped into the first to fourth sub-images, a frame can be transmitted over a dual link (two HD-SDI cables). Therefore, the samples mapped into the first to fourth sub-images can be transmitted over a total of eight HD-SDI cables.

Figure 6:
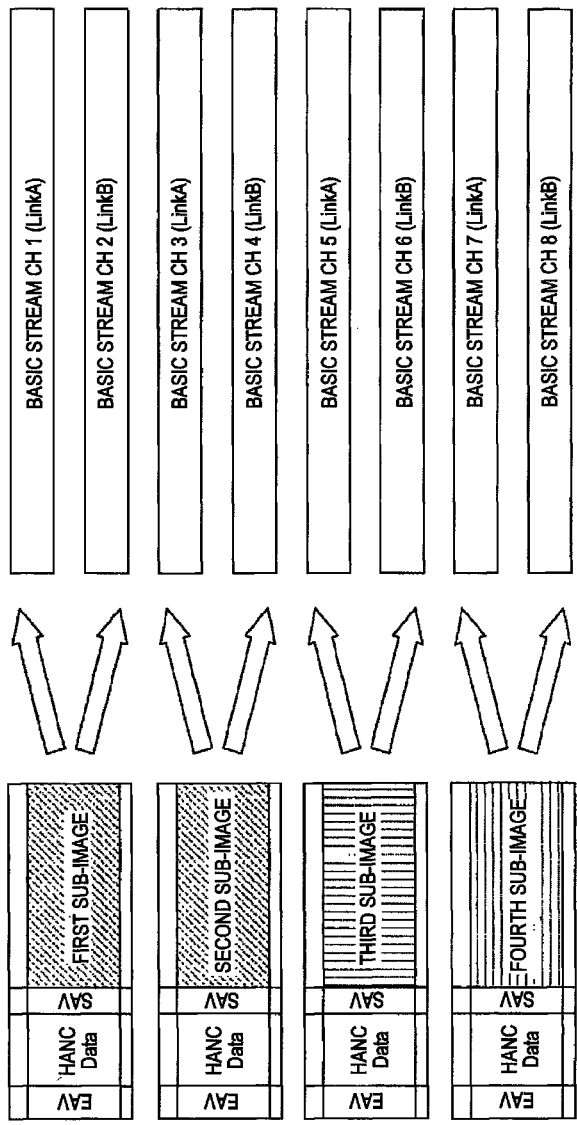
FIG. 6 is a diagram outlining a method of mapping a 4 k×2 k signal into HD-SDI signals in conformity with the 5.4 Octa Link 1.5 Gbps Class of Part 1 of the SMPTE435 standard.

FIG. 6 shows an example in which the first to fourth sub-images into which samples are mapped are mapped into channels classified into links LinkA and LinkB.

The SMPTE435 is a 10G interface standard signifying that HD-SDI signals placed on multiple channels are 8B/10B-encoded in units of two samples (40 bits), thus converted into 50-bit signals, multiplexed channel by channel, and then serially transmitted at a bit rate of 10.692 Gbps or 10.692 Gbps/1.001 (hereinafter, simply, 10.692 Gbps). A technology for mapping a 4 k×2 k signal into the HD-SDI signals is stipulated in FIG. 3 and FIG. 4 in 5.4 Octa Link 1.5 Gbps Class of Part 1 of the SMPTE435.

As shown in FIG. 6, from the mapped first to fourth sub-images, signals on channels CH1 (LinkA) and CH2 (LinkB), signals on channels CH3 (LinkA) and CH4 (LinkB), signals on channels CH5 (LinkA) and CH6 (LinkB), and signals on channels CH7 (LinkA) and CH8 (LinkB) are constructed in conformity with the SMPTE372M (dual link).

The mapping unit 11 in accordance with the present embodiment thins a 3840×2160/24P,25P,30P/4:4:4,4:2:2,4:2:0/10,12-bit signal in units of two samples in a line direction to obtain one sample, and multiplexes the obtained sample into an active period of an HD-SDI signal. Since each sample can be mapped to a 1920×1080/24P,25P,30P/4:4:4,4:2:2,4:2:0/10,12-bit signal on each of four channels, the resultant signals can be transmitted over existing HD-SDI dual-link cables. Further, the signals can be multiplexed and transmitted at 10.692 Gb/s.

When 200h (10-bit system) or 800h (12-bit system) that is a default value for Cch is assigned to 0 in 4:2:0, a 4:2:0 signal can be treated as a signal equivalent to a 4:2:2 signal. For transmission of a 4:2:2/10-bit or 4:2:0/10-bit signal, the link LinkB is not used but only the link LinkA including four channels is used. Talking of a 10.692 Gb/s serial interface, the channel CH1 is needed for clock synchronization. When cables for the channels CH2 to CH8 are not connected, D0.0 is embedded in signals on the channels CH2 to CH8.

Mapped HD-SDI signals on eight channels (see FIG. 6) are equivalent to "a Quad link 292 comparable to a 1920×1080/50P, 60P/4:4:4,4:2:2,4:2:0/12-bit signal×2 channels".

Figure 7A:
FIG. 7A and FIG. 7B are diagrams schematically showing data structures for links LinkA and LinkB respectively in conformity with the SMPTE372M.
Figure 7B:
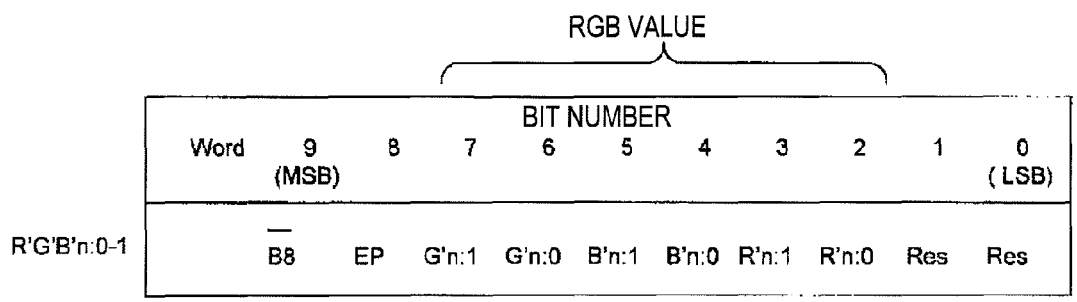

The data structures for signals on the links LinkA and LinkB are specified in Table 2 and FIG. 6 of the SMPTE372M. FIG. 7A and FIG. 7B schematically show the data structures. As shown in FIG. 7A, on the link LinkA, one sample is 20 bits long, and all the bits represent R, G, or B values. Even on the link LinkB, as shown in FIG. 7A, one sample is 20 bits long. As shown in FIG. 7B, out of 10 bits R'G'B'n:0-1, six bits of bit numbers 2 to 7 represent R, G, or B values. Therefore, the number of bits representing R, G, or B values in one sample is 16.

The HD-SDI signals on the channels CH1 to CH8 mapped as mentioned above by the mapping unit 11 are, as shown in FIG. 2, transmitted to an S/P-scrambling-8B/10B unit 12.

Figure 8:
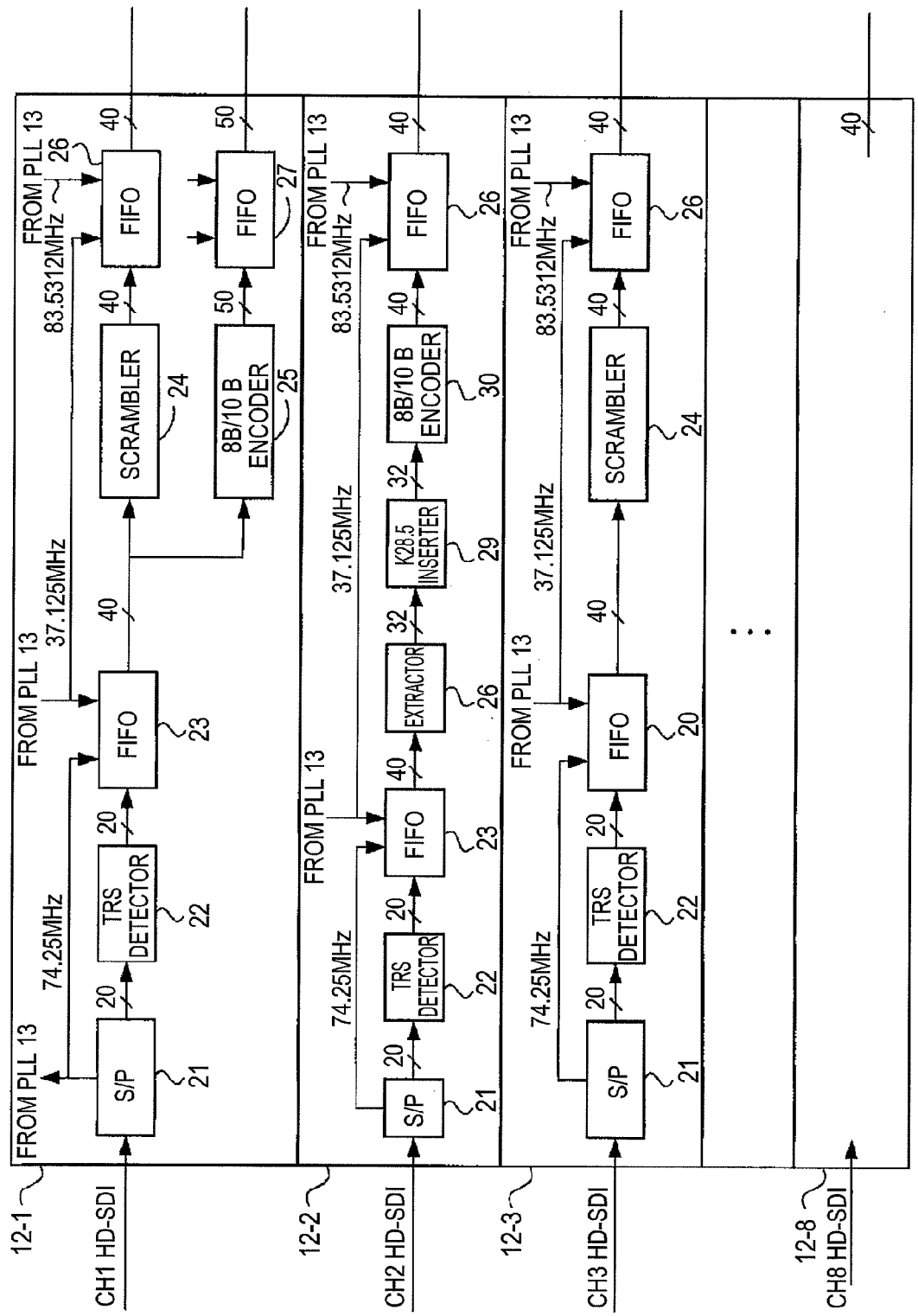
FIG. 8 is a block diagram showing a constitution of an S/P-scrambling-8B/10B unit.

FIG. 8 is a block diagram showing the constitution of the S/P-scrambling-8B/10B unit 12. The S/P-scrambling-8B/10B unit 12 includes eight blocks 12-1 to 12-8 associated on one-to-one basis with the channels CH1 to CH8.

Among the blocks 12-1, 12-3, 12-5, and 12-7 for the channels CH1, CH3, CH5, and CH7 belonging to the link LinkA, the constitution of the block 12-1 is different from those of the blocks 12-3, 12-5, and 12-7. The blocks 12-3, 12-5, and 12-7 share the same constitution (in the drawing, the constitution of the block 12-3 is shown but the constitutions of the blocks 12-5 and 12-7 are not shown). The blocks 12-2, 12-4, 12-6, and 12-8 for the channels CH2, CH4, CH6, and CH8 belonging to the link LinkB share the same constitution (in the drawing, the constitution of the block 12-2 is shown but the constitutions of the blocks 12-4, 12-6, and 12-8 are not shown). In the blocks, the same reference numerals are assigned to components that perform pieces of identical processing.

To begin with, the blocks 12-1, 12-3, 12-5, and 12-7 for the link LinkA will be described. In the blocks 12-1, 12-3, 12-5, and 12-7, inputted HD-SDI signals on the channels CH1, CH3, CH5, and CH7 are transferred to serial-to-parallel (S/P) converters 21. The S/P converter 21 serial-to-parallel converts the HD-SDI signal into parallel digital data of 20 bits wide to be transmitted at a bit rate of 74.25 Mbps or 74.25 Mbps/ 1.001 (hereinafter, simply, 74.25 Mbps), and extracts a clock of 74.25 MHz.

Parallel digital data serial-to-parallel converted by the S/P converter 21 is transmitted to a TRS detector 22. A clock of 74.25 MHz extracted by the S/P converter 21 is transmitted as a writing clock to a FIFO memory 23. Moreover, the clock of 74.25 MHz extracted by the S/P converter 21 in the block 12-1 is also transmitted to a phase locked loop (PLL) 13 shown in FIG. 2.

The TRS detector 22 detects timing reference signals SAV and EAV from a parallel digital video signal sent from the S/P converter 21, and establishes bit synchronization and word synchronization on the basis of the result of the detection.

Parallel digital data having undergone processing of the TRS detector 22 is transmitted to the FIFO memory 23, and written in the FIFO memory 23 responsively to the clock of 74.25 MHz sent from the S/P converter 21.

The PLL 13 in FIG. 2 transmits as a reading clock a clock of 37.125 MHz, which is produced by halving the frequency of the clock of 74.25 MHz sent from the S/P converter 21 in the block 12-1, to the FIFO memories 23 in the respective blocks 12-1 to 12-8, and transmits the clock as a writing clock to FIFO memories 26 in the respective blocks 12-1 to 12-8 and a FIFO memory 27 in the block 12-1.

The PLL 13 transmits as a reading clock a clock of 83.5312 MHz, which is produced by multiplying the frequency of the clock of 74.25 MHz sent from the S/P converter 21 in the block 12-1 by 9/8, to the FIFO memories 26 in the respective blocks 12-1 to 12-8 and the FIFO memory 27 in the block 12-1, and also transmits the clock as a writing clock to the FIFO memory 16 shown in FIG. 2.

The PLL 13 transmits as a reading clock a clock of 167.0625 MHz, which is produced by multiplying the frequency of the clock of 74.25 MHz sent from the S/P converter 21 in the block 12-1 by 9/4, to the FIFO memory 16 shown in FIG. 2.

The PLL 13 transmits as a reading clock a clock of 668.25 MHz, which is produced by multiplying the frequency of the clock of 74.25 MHz sent from the S/P converter 21 in the block 12-1 by 9, to a multi-channel data construction unit 17 shown in FIG. 2.

As shown in FIG. 8, parallel digital data of 20 bits wide written responsively to the clock of 74.25 MHz sent from the S/P converter 21 is read from the FIFO memory 23 as parallel digital data of 40 bits wide in units of two samples responsively to the clock of 37.125 MHz sent from the PLL 13 in FIG. 2, and transmitted to a scrambler 24. In the block 12-1, the parallel digital data of 40 bits wide read from the FIFO memory 23 is also transmitted to an 8B/10B encoder 25.

The scrambler 24 is a self-synchronous scrambler. A self-synchronous scrambling method is a scrambling method adopted in the SMPTE292M, and is such that: a transmitting side regards an inputted serial signal as a polynomial expression, sequentially divides the polynomial expression by a nine-degree primitive polynomial expression $X^9+X^4+1$, transmits the result of the division or the quotient, and thus statistically averagely halves the mark ratio (ratio of is to 0s) of transmission data. The scrambling has the meaning of encryption of a signal using a primitive polynomial expression. The quotient is divided by X+1, whereby polarity-free data (data and reverse data have the same information) is transmitted. On a receiving side, an original serial signal is reproduced by performing the processing (descrambling) of multiplying a received serial signal by X+1 and further multiplying the resultant signal by the primitive polynomial expression $X^9+X^4+1$.

The scrambler 24 does not scramble all data items on each horizontal line but scrambles only a timing reference signal SAV, an active line, a timing reference signal EAV, a line number LN, and an error detection code CRC. The scrambler 24 does not scramble data of a horizontal blanking period. Immediately previously to the timing reference signal SAV, all the values in a register in the scrambler are set to 0s, and encoding is carried out. Data of up to 10 bits long succeeding the error detection code CRC is outputted.

A reason why the scrambler 24 performs the foregoing processing will be described below. In the conventional self-synchronous scrambling method, all data items on each horizontal line are intermittently transmitted. However, in the present example, data of a horizontal blanking period having undergone self-synchronous scrambling is not transmitted. As a method for this purpose, there is a method in which although all data items on each horizontal line including the horizontal blanking period are scrambled, the data of the horizontal blanking period is not transmitted. However, according to the method, continuity of data items is not ensured by the scrambler for transmission and a descrambler for reception. Therefore, when the descrambler on the receiving side reproduces data, the descrambler miscalculates or incorrectly carries the last several bits of a CRC. The error detection code CRC is therefore not accurately reproduced. There is a method in which a clock for a scrambler is stopped during a horizontal blanking interval, during which no data is transmitted, so that the CRC can be accurately reproduced. When the method is adopted, the subsequent timing reference signal SAV is needed during calculation of the CRC. This poses a problem in that timing control becomes hard to do.

Only data items of a timing reference signal SAV, an active line, a timing reference signal EAV, a line number LN, and an error detection code CRC are therefore scrambled. Immediately previously to the timing reference signal SAV, all the values in a register in the scrambler 24 are set to 0s, and encoding is carried out. Data of at least several bits (for example, 10 bits) long succeeding the error detection code CRC is outputted.

Thus, in an apparatus on a receiving side, immediately previously to the timing reference signal SAV, all the values in a register in a descrambler are set to 0s, and decoding is initiated. Data of at least several bits long succeeding the error detection code CRC is descrambled. Thus, calculation is accurately performed in consideration of carrying by the descrambler serving as a multiplication circuit, whereby original data can be reproduced.

Further, calculations have revealed that when all the values in the register in the scrambler are set to 0s immediately previously to the timing reference signal SAV, a pathological pattern is not generated in scrambled data. What is referred to as the pathological pattern is generation of a signal exhibiting a pattern (or a reverse pattern) that has, as shown in FIG. 9A, "H" of one bit succeeded by continuation of "L" over nineteen bits, or generation of a signal exhibiting a pattern (or a reverse pattern) that has, as shown in FIG. 9B, continuation of "H" over twenty bits succeeded by continuation of "L" over twenty bits, along one horizontal line on a serial transmission path when data is subjected to self-synchronous scrambling.

The pattern shown in FIG. 9A and the reverse pattern are patterns having a dc component as a majority. In order to realize a transmission rate that is as high as 10 Gbps, an ac-coupled transmission system is generally employed. However, in the ac-coupled transmission system, when the dc component occupies the majority, a warp of a base line like the one shown in FIG. 10 takes place. Therefore, an apparatus on a receiving side has to reproduce the dc component.

The pattern shown in FIG. 9B and the reverse pattern are patterns in which a transition from 0 to 1 or from 1 to 0 hardly occurs. A receiving apparatus therefore has difficulty in reproducing a clock from a serial signal.

As described previously, calculations have revealed that when all the values in a register in a scrambler are set to 0s immediately previously to a timing reference signal SAV, the pathological pattern does not occur. A produced signal can be said to be acceptable as a transmission code.

As shown in FIG. 11, two low-order bits of XYZ that is the last word in the timing reference signal SAV (word for use in discriminating a first field of a frame from a second field thereof or discriminating SAV from EAV) may be set to 0s. For example, the scrambler 24 in the block 12-1 performs scrambling with the two low-order bits set to 0s. The scrambler 24 in the block 12-3 performs scrambling after rewriting the two low-order bits to 0 and 1 respectively. The scrambler 24 in the block 12-5 performs scrambling after rewriting the two low-order bits into 1 and 0 respectively. The scrambler 24 in the block 12-7 performs scrambling after rewriting the two low-order bits to 1s. Thus, scrambling is performed with the values of the two low-order bits varied among the channels CH1, CH3, CH5, and CH7.

A reason why the foregoing processing is performed will be described below. When a 3840×2160/24P,25P,30P/4:4:4, 4:2:2,4:2:0/10,12-bit signal is a flat signal (representing nearly the same R, G, and B values over an entire screen), if data values are uniform between the channel CH1, CH3, CH5, or CH7 and the channel CH2, CH4, CH6, or CH8, electromagnetic interference (EMI) or the like takes place. This is not preferable. In contrast, when the values of the two low-order bits of XYZ in SAV are varied among the channels CH1, CH3, CH5, and CH7, if scrambling is performed, the result of division of each of 0 and 1, 1 and 0, and 1 and 1 by a production polynomial expression is transmitted in addition to data, which has the two low-order bits of XYZ set to 0s, as scrambled data. Therefore, uniformity of data items can be avoided.

Further, calculations have revealed that even when the values of the two low-order bits of XYZ are varied channel by channel, if all the values in the register in the scrambler are set to 0s immediately previously to the timing reference signal SAV, the pathological pattern does not occur.

Parallel digital data of 40 bits wide scrambled by the scrambler 24 as mentioned above is written in the FIFO memory 26 responsively to the clock of 37.125 MHz sent from the PLL 13 shown in FIG. 2. Thereafter, the parallel digital data is read from the FIFO memory 26 responsively to the clock of 83.5312 MHz sent from the PLL 13 while having the width of 40 bits left intact, and then transmitted to a multiplexing unit 14 shown in FIG. 2.

The 8B/10B encoder 25 in the block 12-1 8-bit-to-10-bit encodes data of a horizontal blanking period alone out of parallel digital data of 40 bits wide read from the FIFO memory 23.

Parallel digital data of 50 bits wide having been 8-bit-to-10-bit encoded by the 8B/10B encoder 25 is written in the FIFO memory 27 responsively to the clock of 37.125 MHz sent from the PLL 13 in FIG. 2. Thereafter, the parallel digital data is read from the FIFO memory 27 responsively to the clock of 83.5312 MHz sent from the PLL 13 while having the width of 50 bits left intact, and transmitted to the multiplexing unit 14 shown in FIG. 2.

Data of a horizontal blanking period is transmitted from the block 12-1 alone (that is, data on the channel CH1 is transmitted) to the multiplexing unit 14, but data items of horizontal blanking periods (on the channels CH3, CH5, and CH7) are not transmitted from the respective blocks 12-3, 12-5, and 12-7 to the multiplexing unit 14. This is because of the restrictions imposed on an amount of data.

Next, the blocks 12-2, 12-4, 12-6, and 12-8 for the link LinkB will be described below. In the blocks 12-2, 12-4, 12-6, and 12-8, inputted HD-SDI signals on the channels CH2, CH4, CH6, and CH8 are subjected to the same processing as the processing, which is performed in the blocks 12-1, 12-3, 12-5, and 12-7, by the respective S/P converters 21 and TRS detectors 22, and then transmitted to respective extractors 28.

The extractor 28 is a circuit that extracts bits of R, G, and B values (sixteen bits representing R, G, and B values out of twenty bits constituting one sample on the link LinkB shown in FIG. 7B) from only data items of a timing reference signal SAV, an active line, a timing reference signal EAV, a line number LN, and an error detection code CRC out of all data items on each horizontal line on the link LinkB.

Parallel digital data of 16 bits wide extracted by the extractor 28 is written in the FIFO memory 23 responsively to the clock of 74.25 MHz sent from the S/P converter 21. Thereafter, the parallel digital data is read as parallel digital data of 32 bits wide in units of two samples responsively to the clock of 37.125 MHz sent from the PLL 13 in FIG. 2, and transmitted to a K28.5 inserter 29.

The K28.5 inserter 29 inserts 8-bit word data to the leading part of the timing reference signal SAV or EAV. The 8-bit word data is converted into 10-bit word data (called a code name of K28.5), which is not used as word data representing a video signal, during 8-bit-to-10-bit encoding.

Parallel digital data of 32 bits wide having undergone the processing of the K28.5 inserter 29 is transmitted to an 8B/10B encoder 30. The 8B/10B encoder 30 8-bit-to-10-bit encodes the parallel digital data of 32 bits wide, and outputs the resultant data.

The reason why parallel digital data of 32 bits wide constructed in units of two samples is 8-bit-to-10-bit encoded by the 8B/10B encoder 30 is to make the parallel digital data compatible with forty high-order bits of a content ID of 50 bits long specified in the SMPTE435 that is an 10G interface standard.

Parallel digital data of 40 bits wide 8-bit-to-10-bit encoded by the 8B/10B encoder 30 is written in the FIFO memory 26 responsively to the clock of 37.125 MHz sent from the PLL 13 in FIG. 2. Thereafter, the parallel digital data is read from the FIFO memory 26 responsively to the clock of 83.5312 MHz sent from the PLL 13 while having the width of 40 bits left intact, and transmitted to the multiplexing unit 14 shown in FIG. 2.

Figure 12A:
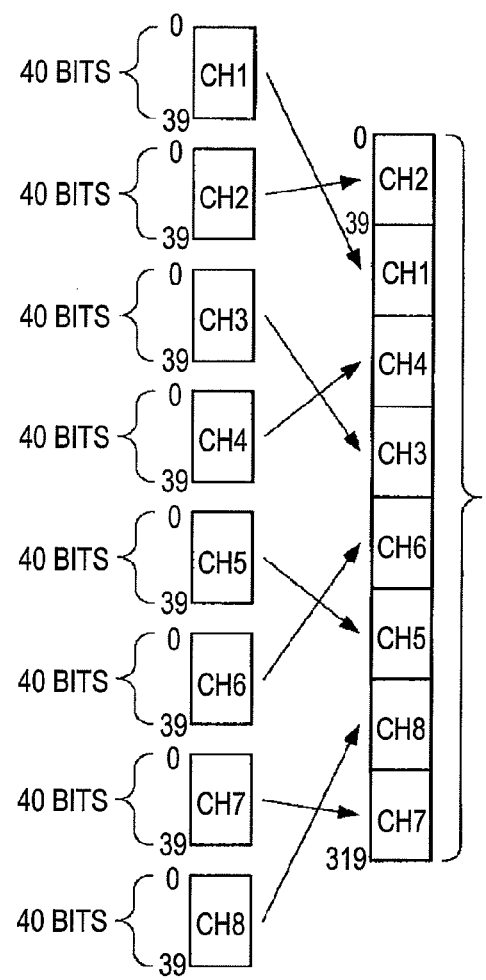
FIG. 12A and FIG. 12B are diagrams showing multiplexing in a multiplexing unit.

The multiplexing unit 14 shown in FIG. 2 multiplexes parallel digital data items of 40 bits wide on the channels CH1 to CH8 (data items of only a timing reference signal SAV, an active line, a timing reference signal EAV, a line number LN, and an error detection code CRC), which are read from the FIFO memories 26 in the respective blocks 12-1 to 12-8 in the S/P-scrambling-8B/10B unit 12, in units of 40 bits in the order of the channel CH2 (channel whose data is 8-bit-to-10-bit encoded), the channel CH1 (channel whose data is subjected to self-synchronous scrambling), the channel CH4 (channel whose data is 8-bit-to-10-bit encoded), the channel CH3 (channel whose data is subjected to self-synchronous scrambling), the channel CH6 (channel whose data is 8-bit-to-10-bit encoded), the channel CH5 (channel whose data is subjected to self-synchronous scrambling), the channel CH8 (channel whose data is 8-bit-to-10-bit encoded), and the channel CH7 (channel whose data is subjected to self-synchronous scrambling), as shown in FIG. 12A. Thus, the multiplexing unit 14 produces data of 320 bits wide.

Data 8-bit-to-10-bit encoded is inserted to data, which is subjected to self-synchronous scrambling, in units of 40 bits. Therefore, a variation in a mark ratio (a ratio of 0s to 1s) dependent on a scrambling method and unstableness in a transition from 0 to 1 or from 1 to 0 are resolved. Eventually, occurrence of the aforesaid pathological pattern can be prevented.

Figure 12B:
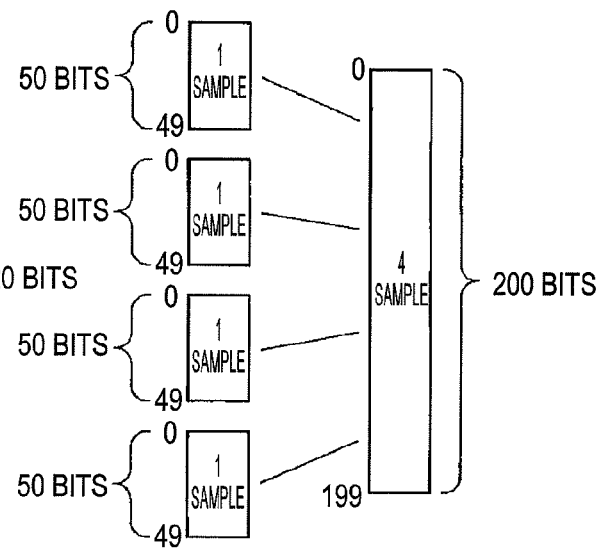

The multiplexing unit 14 multiplexes, as shown in FIG. 12B, parallel digital data items of 50 bits wide of four samples, which are contained in only a horizontal blanking period of data on the channel CH1 and are read from the FIFO memory 27 in the block 12-1 in the S/P-scrambling-8B/10B unit 12, so as to produce data of 200 bits wide.

Parallel digital data of 320 bits wide and parallel digital data of 200 bits wide which result from multiplexing performed by the multiplexing unit 14 are transmitted to a data length conversion unit 15. The data length conversion unit 15 is formed using a shift register. Data of 256 bits wide into which the parallel digital data of 320 bits wide is converted, and data of 256 bits wide into which the parallel digital data of 200 bits wide is converted are used to construct parallel digital data of 256 bits wide. The parallel digital data of 256 bits wide is further converted into data of 128 bits wide.

Figure 13:
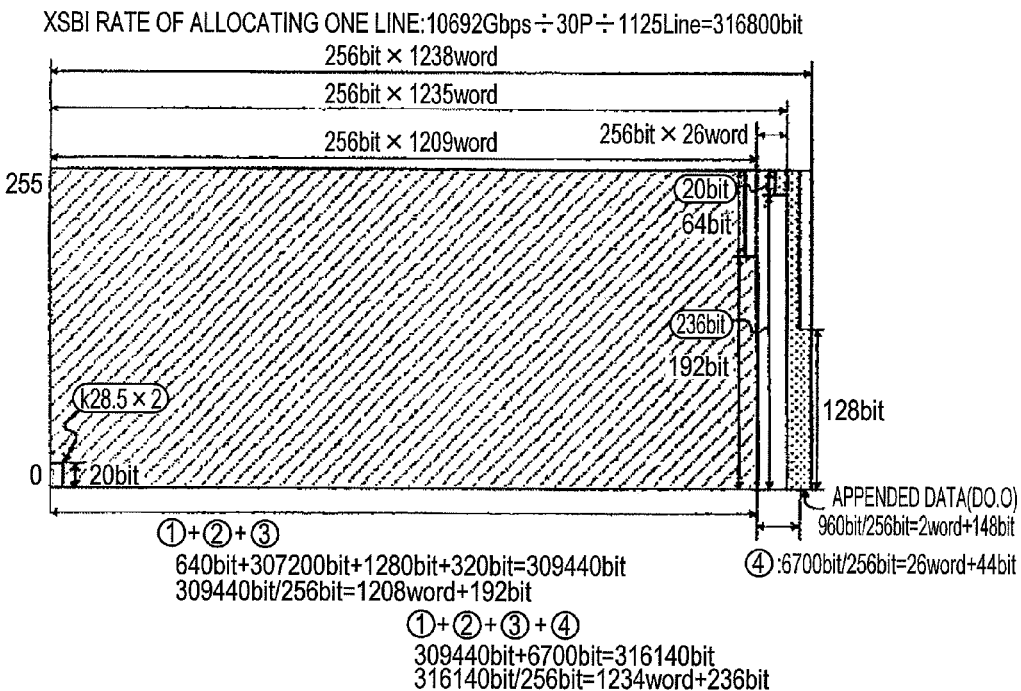
FIG. 13 is a diagram showing the structure of data to be constructed by a data length conversion unit.
Figure 14:
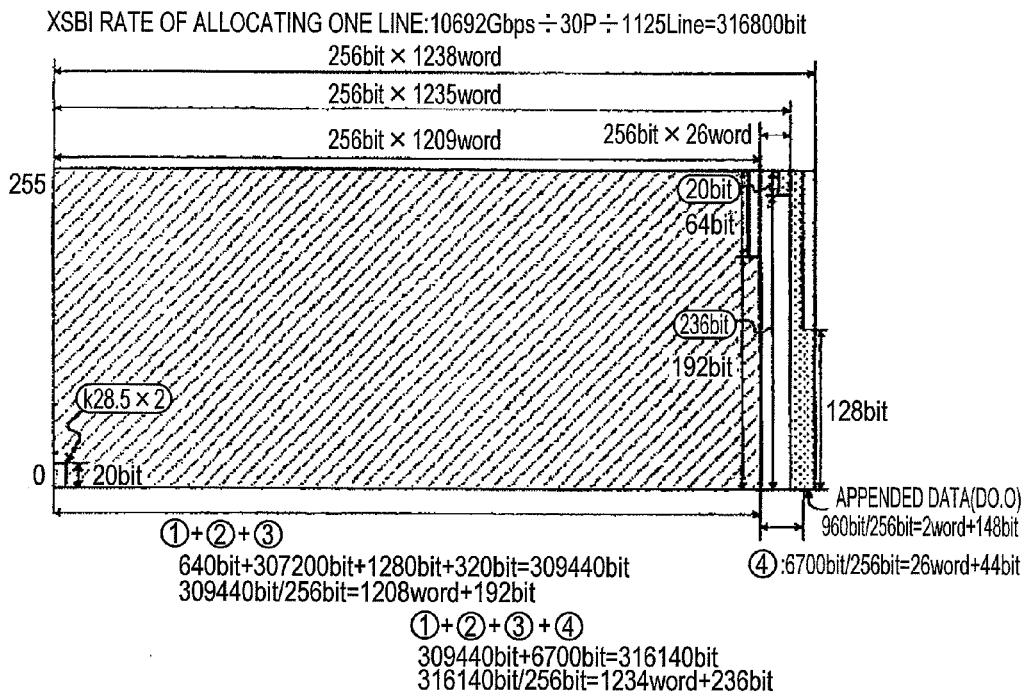
FIG. 14 is a diagram showing the structure of data to be constructed by the data length conversion unit.
Figure 15:
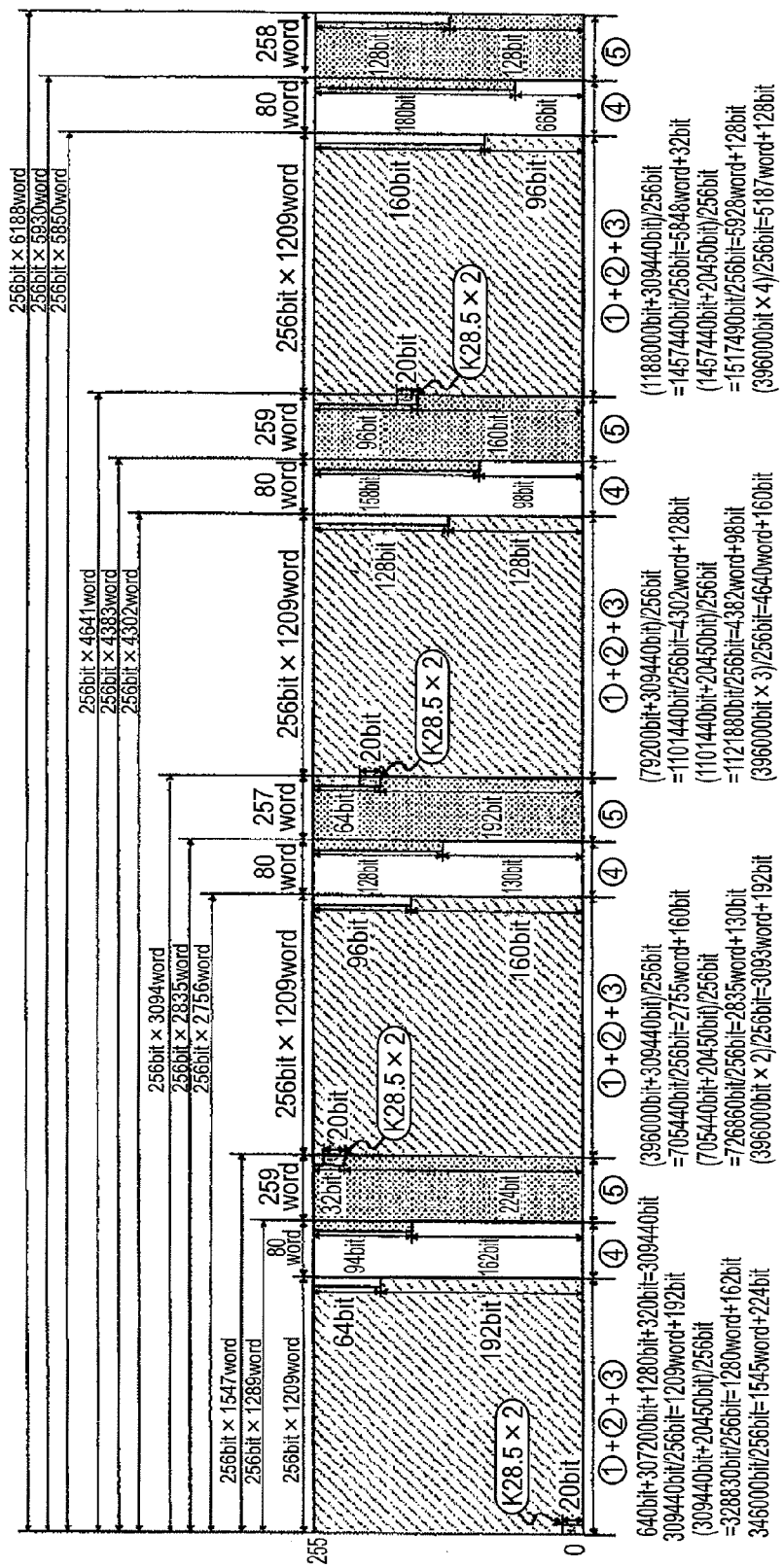
FIG. 15 is a diagram showing the structure of data to be constructed by the data length conversion unit.

FIG. 13 to FIG. 15 are diagrams showing the structures of parallel digital data of 256 bits wide constructed by the data length conversion unit 15. FIG. 13 shows the data structure for one line in the 30P mode. FIG. 14 shows the data structure for one line in the 25P mode. FIG. 15 shows the data structures for four lines in the 24P mode (since the number of bits of the last word becomes 128 in cycles of four lines in the 24P mode, the data structures for four lines are depicted). Under the SMPTE435, a frame rate and the number of lines are identical to those of an HD-SDI signal on the channel CH1. The S/P-scrambling-8B/10B unit 12 adopts both scrambling and 8B/10B encoding, and performs scrambling on data on the channel CH1 (scrambling adopted by the SMPTE292M). Therefore, the data structures shown in FIG. 13 to FIG. 15 are basically identical to those for the HD-SDI signal.

As shown in FIG. 13 to FIG. 15, data on one line includes three fields mentioned below.

Hatched field: a field for sets of data items of a timing reference signal SAV, active line, timing reference signal EAV, line number LN, and error detection code CRC on the channels CH1 to CH8, which are multiplexed in units of 40 bits in the order of the channels CH2, CH1, CH4, CH3, CH6, CH5, CH8, and CH7.

Blank field: a field of data items of 50 bits long of a horizontal blanking period on the channel CH1 which are 8B/10B encoded.

Dot-patterned field: a field of appended data for use in adjusting an amount of data.

As shown in FIG. 2, parallel digital data converted into data of 128 bits wide by the data length conversion unit 15 is transmitted to a FIFO memory 16, and written in the FIFO memory 16 responsively to a clock of 83.5312 MHz sent from the PLL 13.

Parallel digital data of 128 bits wide written in the FIFO memory 16 is read from the FIFO memory 16 as parallel digital data of 64 bits wide responsively to a clock of 167.0625 MHz sent from the PLL 13 in FIG. 2, and transmitted to a multi-channel data construction unit 17.

The multi-channel data construction unit 17 is, for example, a ten gigabit-sixteen bit interface (XSBI) (16-bit interface to be used in a 10-gigabit Ethernet (Ethernet is a registered trademark) system). The multi-channel data construction unit 17 uses a clock of 668.25 MHz sent from the PLL 13 to construct serial digital data items on sixteen channels, which permit a bit rate of 668.25 Mbps, from parallel digital data of 64 bits wide read from the FIFO memory 16. The serial digital data items on sixteen channels constructed by the multi-channel data construction unit 17 are transmitted to a multiplexing-P/S conversion unit 18.

The multiplexing-P/S conversion unit 18 multiplexes serial digital data items on sixteen channels sent from the multi-channel data construction unit 17, and parallel-to-serial converts the multiplexed parallel digital data so as to produce serial digital data items that permit 668.25 Mbps×16=10.692 Gbps. The multiplexing-P/S conversion unit 18 in this example has the capability of a parallel-to-serial conversion unit that serially converts first, second, third, and fourth subimages mapped by the mapping unit 11.

Figure 16A:
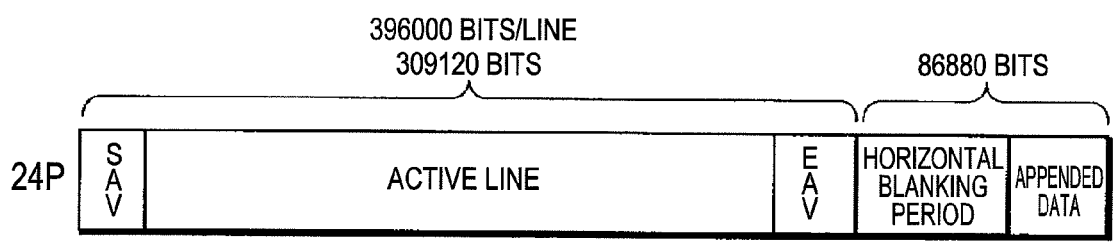
FIG. 16A, FIG. 16B, and FIG. 16C are diagrams showing the structures for one line of serial digital data that permits 10.692 Gbps and is produced by a multiplexing-P/S conversion unit.
Figure 16B:
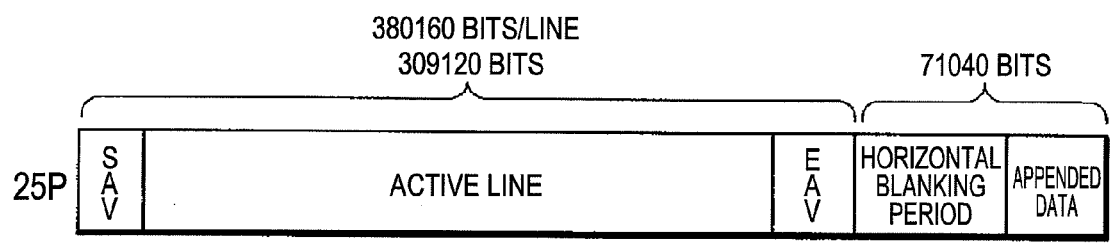
Figure 16C:
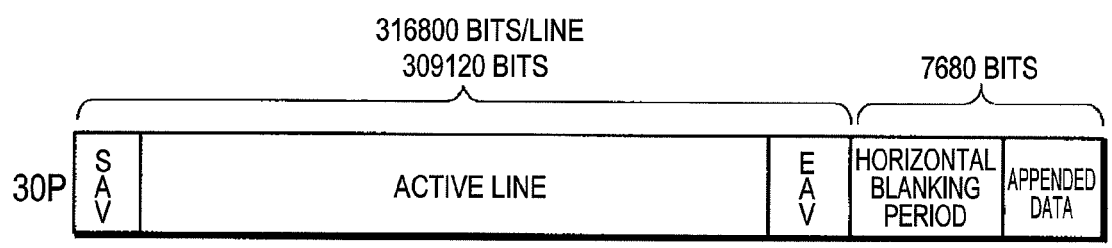

FIG. 16A, FIG. 16B, and FIG. 16C are diagrams showing data structures for one line in serial digital data permitting 10.692 Gbps. FIG. 16A shows the structure in the 24P mode, FIG. 16B shows the structure in the 25P mode, and FIG. 16C shows the structure in the 30P mode. In the drawings, SAV, an active line, and EAV are shown as data items including a line number LN and an error detection code CRC. A horizontal blanking period is shown to include a field of appended data shown in FIG. 13 to FIG. 15.

The numbers of bits on one line in the 24P, 25P, and 309 modes respectively are obtained according to the expressions below.

$$10.692 \; Gbps \div 24 \; \text{frames/sec} \div 1125 \; \text{lines/frame} =$$
$$396000 \; \text{bits} \quad 10.692 \; Gbps \div 25 \; \text{frames/sec} \div 1125 \; \text{lines/frame} = 380160$$
$$\text{bits} \quad 10.692 \; Gbps \div 30 \; \text{frames/sec} \div 1125 \; \text{lines/frame} = 316800 \; \text{bits}$$

The number of bits of the timing reference signal SAV, active line, timing reference signal EAV, line number LN, and error detection code CRC is obtained according to the expression below.

$$(1920T+12T) \times 36 \; \text{bits} \times 4 \; \text{channels} \times 40/36 = 309120 \; \text{bits}$$

The numbers of bits of a horizontal blanking period in the 24P, 25P, and 30P modes respectively are obtained according to the expressions below.

(1) In the 24P mode:

396000 bits−309120 bits=86880 bits $$(2750T-1920T-12T(SAV+EAV+LN+CRC)) \times 20 \; \text{bits} \times 10/8 = 20450 \; \text{bits}$$

86880 bits>20450 bits (2) In the 25P mode;

380160 bits−309120 bits=71040 bits $$(2640T-1920T-12T(SAV+EAV+LN+CRC)) \times 20 \; \text{bits} \times 10/8 = 17700 \; \text{bits}$$

71040 bits>17700 bits (3) In the 30P mode:

316800 bits−309120 bits=7680 bits $$(22T-1920T-12T(SAV+EAV+LN+CRC)) \times 20 \; \text{bits} \times 10/8 = 6700 \; \text{bits}$$

7680 bits>6700 bits

As shown above, in all of the 24P, 25P, and 30P modes, the numbers of bits of a horizontal blanking period specified in the SMPTE435, that is, 86880 bits, 71040 bits, and 7680 bits are larger than the numbers of bits of data on the channel CH1 {data of the horizontal blanking period−(data items of the timing reference signal SAV, timing reference signal EAV, line number LN, and error detection code CRC)}, that is, 20450 bits, 17700 bits, and 6700 bits respectively. Therefore, the data of the horizontal blanking period on the channel CH1 can be multiplexed.

As shown in FIG. 2, serial digital data that is produced by the multiplexing-P/S conversion unit 18 and permits a bit rate of 10.692 Gbps is transmitted to a photoelectric conversion unit 19. The photoelectric conversion unit 19 functions as an output unit that outputs the serial digital data, which permits the bit rate of 10.692 Gbps, to the CCU 2. The serial digital data that permits the bit rate of 10.692 Gbps and is converted into a light signal by the photoelectric conversion unit 19 is transmitted from the broadcasting camera 1 to the CCU 2 over the optical fiber cable 3 shown in FIG. 1.

Using the signal transmitting device 5 of the present embodiment, signal processing to be performed on a side of transmitting a 3840×2160/24P,25P,30P/4:4:4,4:2:2,4:2:0/10, 12-bit signal as serial digital data can be carried out. In the signal transmitting device 5 and signal transmitting method, when the 3840×2160/24P,25P,30P/4:4:4,4:2:2,4:2:0/10,12-bit signal is mapped into HD-SDI signals on the channels CH1 to CH8 (channels CH1, CH3, CH5, and CH7 belonging to the link LinkA, and channels CH2, CH4, CH7, and CH8 belonging to the link LinkB), the HD-SDI signals are serial-to-parallel converted. Thereafter, the signals on the link LinkA are subjected to self-synchronous scrambling, and the signals on the link LinkB have the R, G, and B bits thereof 8-bit-to-10-bit encoded.

As for the link LinkA, self-synchronous scrambling is not performed on all data items on each horizontal line but is performed on only data items of the timing reference signal SAV, active line, timing reference signal EAV, line number LN, and error detection code CRC. The self-synchronous scrambling is not performed on data of the horizontal blanking period. All the values in the register in the scrambler are set to 0s immediately previously to the timing reference signal SAV, and encoding is carried out. Data of at least several bits succeeding the error detection code CRC is outputted.

A reason why the foregoing scrambling is performed will be described below. In the conventional self-synchronous scrambling method, all data items on each horizontal line are unintermittently transmitted. In the present embodiment, data of the horizontal blanking period having undergone self-synchronous scrambling is not transmitted. As a method for this purpose, there is a method in which although all data items on each horizontal line including data of the horizontal blanking period are scrambled, only the data of the horizontal blanking period is not transmitted. However, according to the method, continuity of data items is not ensured by a scrambler for transmission and a descrambler for reception. Therefore, when the descrambler on the receiving side reproduces data, the descrambler miscalculates or incorrectly carries the last several bits of a CRC. The error detection code CRC is therefore not accurately reproduced. There is a method of accurately reproducing the CRC by stopping a clock for the scrambler during a horizontal blanking interval during which no data is transmitted. When the method is adopted, the calculation of the CRC requires the subsequent timing reference signal SAV. This poses a problem in that timing control becomes hard to do.

Therefore, only the data items of the timing reference signal SAV, active line, timing reference signal EAV, line number LN, and error detection code CRC are scrambled. All the values in the register in the scrambler are set to 0s immediately previously to the timing reference signal SAV, and encoding is carried out. Data of at least several bits succeeding the error detection code CRC is outputted.

In the apparatus on the receiving side, all the values in the register in the descrambler are set to 0s immediately previously to the timing reference signal SAV, and decoding is initiated. In addition, data of at least several bits long succeeding the error detection code CRC is descrambled. Therefore, calculation can be performed accurately in consideration of carrying by the descrambler serving as a multiplication circuit in order to reproduce original data.

Further, calculations have revealed that when all the values in the register in the scrambler are set to 0s immediately previously to the timing reference signal SAV, a pathological pattern does not occur in scrambled data. A produced signal can be said to be acceptable as a transmission code.

As for the link LinkB, R, G, and B bits are extracted from only the data items of the timing reference signal SAV, active line, timing reference signal EAV, line number LN, and error detection code CRC among all data items on each horizontal line. The R, G, and B bits are 8-bit-to-10-bit encoded. The data items on the link LinkA having undergone self-synchronous scrambling and the data items on the link LinkB having been 8-bit-to-10-bit encoded are multiplexed. Serial digital data permitting a bit rate of 10.692 Gbps is produced from the multiplexed parallel digital data items.

Figure 17:
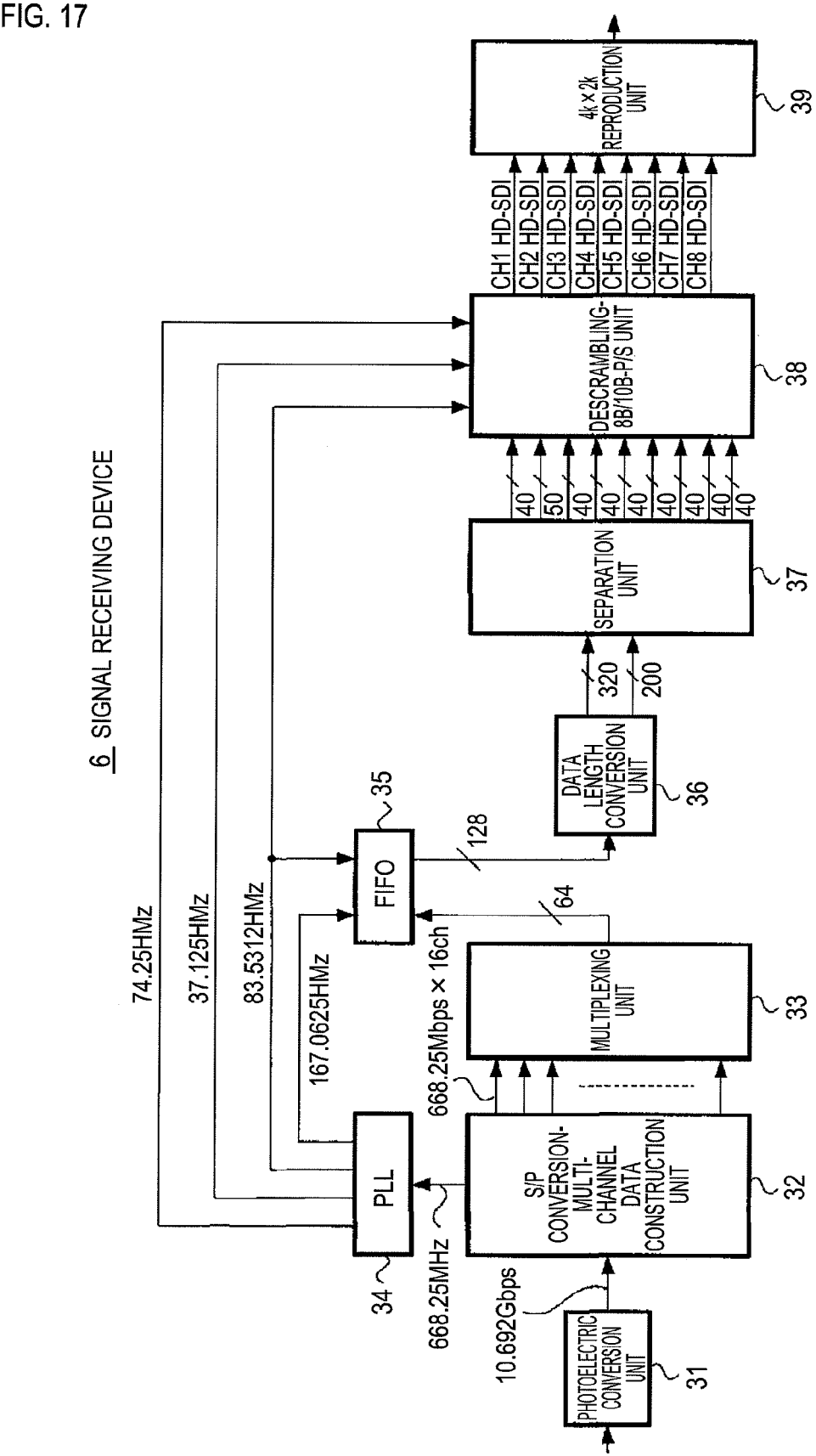
FIG. 17 is a block diagram showing an example of an internal constitution of a signal receiving device out of the circuitry of a CCU.

FIG. 17 is a block diagram showing a portion relating to the present embodiment in the circuitry of the CCU 2. In the CCU 2, multiple sets of circuits like those shown in FIG. 17 are included in one-to-one association with broadcasting cameras 1.

Serial digital data that is transmitted from the broadcasting camera 1 over the optical fiber cable 3 and permits a bit rate of 10.692 Gbps is converted into an electrical signal by a photoelectric conversion unit 31, and then transmitted to a S/P conversion-multi-channel data construction unit 32. The S/P conversion-multi-channel data construction unit 32 is, for example, the aforesaid XSBI. The S/P conversion-multi-channel data construction unit 32 receives first, second, third, and fourth sub-images into which a video signal is mapped and each of which is separated into a first-link channel and a second-link channel.

The S/P conversion-multi-channel data construction unit serial-to-parallel converts serial digital data that permits a bit rate of 10.692 Gbps, constructs serial digital data items on sixteen channels, which permit a bit rate of 668.25 Mbps, from parallel digital data resulting from the serial-to-parallel conversion, and extracts a clock of 668.25 MHz.

Parallel digital data items on sixteen channels constructed by the S/P conversion-multi-channel data construction unit 32 are transmitted to a multiplexing unit 33. A clock of 668.25 MHz extracted by the S/P conversion-multi-channel data construction unit 32 is transmitted to a PLL 34.

The multiplexing unit 33 multiplexes serial digital data items on sixteen channels sent from the S/P conversion-multi-channel data construction unit 32, and transmits parallel digital data of 64 bits wide to a FIFO memory 35.

The PLL 34 transmits a clock of 167.0625 MHz, which has a quarter of the frequency of the clock of 668.25 MHz sent from the S/P conversion-multi-channel data construction unit 32, as a writing clock to the FIFO memory 35.

The PLL 34 transmits a clock of 83.5312 MHz, which has a one-eighth of the frequency of the clock of 668.25 MHz sent from the S/P conversion-multi-channel data construction unit 32, as a reading clock to the FIFO memory 35, and transmits the clock as a writing clock to a FIFO memory 44 incorporated in a descrambling-8B/10B-P/S unit 38 that will be described later.

The PLL 34 transmits a clock of 37.125 MHz, which has a one-eighteenth of the frequency of the clock of 668.25 MHz sent from the S/P conversion-multi-channel data construction unit 32, as a reading clock to the FIFO memory 44 and transmits the clock to the FIFO memory 45 incorporated in the descrambling-8B/10B-P/S unit 38, as a writing clock.

The PLL 34 transmits a clock of 74.25 MHz, which has a one-ninth of the frequency of the clock of 668.25 MHz sent from the S/P conversion-multi-channel data construction unit 32, as a reading clock to the FIFO memory 45 in the descrambling-8B/10B-P/S unit 38.

In the FIFO memory 35, parallel digital data of 64 bits wide sent from the multiplexing unit 33 is written responsively to the clock of 167.0625 MHz sent from the PLL 34. The parallel digital data written in the FIFO memory 35 is read as parallel digital data of 128 bits wide responsively to the clock of 83.5312 MHz sent from the PLL 34, and transmitted to a data length conversion unit 36.

The data length conversion unit 36 is formed using a shift register, and converts parallel digital data of 128 bits wide into data of 256 bits wide (data having the structure shown in any of FIG. 13 to FIG. 15). The data length conversion unit 36 detects K28.5 inserted into each of timing reference signals SAV or EAV so as to discriminate line periods from one another, converts sets of data items of the timing reference signal SAV, active line, timing reference signal EAV, line number LN, and error detection code CRC into data of 320 bits wide, and converts data of a horizontal blanking period (as mentioned previously, data of a horizontal blanking period on a channel CH1 having been 8B/10B encoded) into data of 200 bits wide. Appended data shown in FIG. 13 to FIG. 15 is discarded.

Parallel digital data of 320 bits wide and parallel digital data of 200 bits wide that have the data lengths thereof converted by the data length conversion unit 36 are transmitted to a separation unit 37.

The separation unit 37 separates parallel digital data of 320 bits wide, which is sent from the data length conversion unit 36 (sets of data items of the timing reference signal SAV, active line, timing reference signal EAV, line number LN, and error detection code CRC), into data items on channels CH1 to CH8 (see FIG. 12A) that are 40-bit data items identical to data items which are not multiplexed by the multiplexing unit 14 (FIG. 2) included in the broadcasting camera 1. The parallel digital data items of 40 bits wide on the channels CH1 to CH8 are transmitted to the descrambling-8B/10B-P/S unit 38.

The separation unit 37 separates parallel digital data of 200 bits wide, which is sent from the data length conversion unit 36 (data of a horizontal blanking period on a channel CH1 having been 8B/10B encoded), into 50-bit data items (see FIG. 12B) identical to data items that have not been multiplexed by the multiplexing unit 14. The parallel digital data items of 50 bits wide are transmitted to the descrambling-8B/10B-P/S unit 38.

Figure 18:
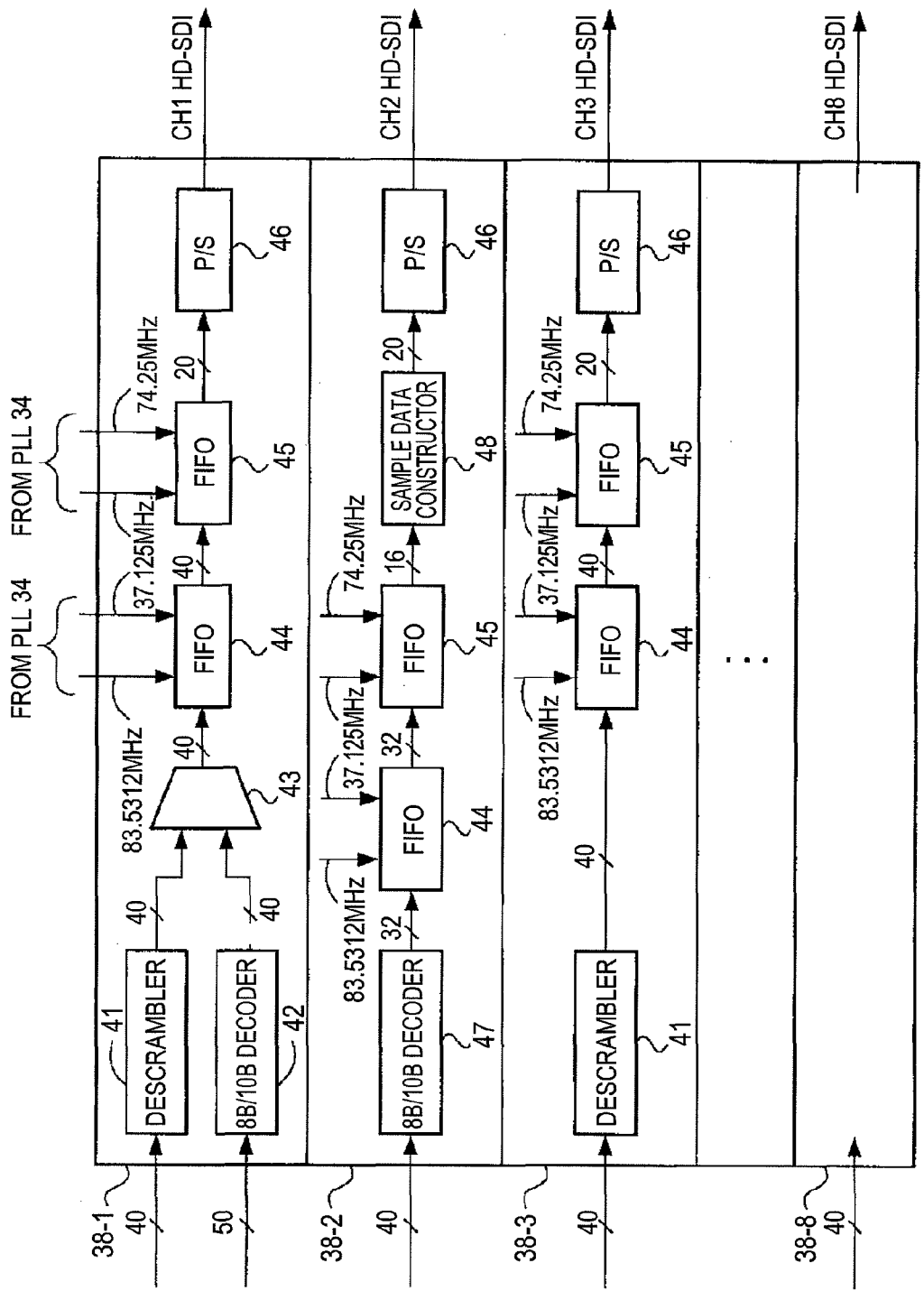
FIG. 18 is a block diagram showing a constitution of an S/P-scrambling-8B/10B unit.

FIG. 18 is a block diagram showing the constitution of the descrambling-8B/10B-P/S unit 38. The descrambling-8B/10B-P/S unit 38 includes eight blocks 38-1 to 38-8 associated on a one-to-one basis with the channels CH1 to CH8. The descrambling-8B/10B-P/S unit 38 functions as a receiving unit that receives first, second, third, and fourth sub-images into which an image signal is mapped and each of which is divided into a first-link channel and a second-link channel.

Among the blocks 38-1, 38-3, 38-5, and 38-7 for the channels CH1, CH3, CH5, and CH7 belonging to a link LinkA, the block 38-1 has a different constitution from the other blocks 38-3, 38-5, and 38-7 do. The blocks 38-3, 38-5, and 38-7 share the same constitution (in the drawing, the constitution of the block 38-3 is shown but the constitutions of the blocks 38-5 and 38-7 are not shown). The blocks 38-2, 38-4, 38-6, and 38-8 for the channels CH2, CH4, CH6, and CH8 belonging to a link LinkB share the same constitution (in the drawing, the constitution of the block 38-2 is shown but the constitutions of the blocks 38-4, 38-6, and 38-8 are not shown). In the blocks, the same reference numerals are assigned to components that perform pieces of identical processing.

To begin with, the blocks 38-1, 38-3, 38-5, and 38-7 for the link LinkA will be described below. In the blocks 38-1, 38-3, 38-5, and 38-7, inputted parallel digital data items of 40 bits wide (each including data items of a timing reference signal SAV, an active line, a timing reference signal EAV, a line number LN, and an error detection code CRC which have undergone self-synchronous scrambling) on the channels CH1, CH3, CH5, and CH7 are transmitted to respective descramblers 41.

The descrambler 41 is a self-synchronous descrambler. The descrambler 41 descrambles received parallel digital data, sets all the values in a register in the descrambler 41 to 0s immediately previously to the timing reference signal SAV, and then initiates decoding. In addition, the descrambler 41 performs self-synchronous descrambling on data of 10 bits long succeeding the error detection code CRC.

As described in relation to the scrambler 24 (FIG. 8) incorporated in the broadcasting camera 1, although data of a horizontal blanking period having undergone self-synchronous scrambling is not transmitted, calculation is accurately performed in consideration of carrying by the descrambler 41, which serves as a multiplication circuit, in order to reproduce original data.

After performing self-synchronous scrambling, the descrambler 41 changes the values of two low-order bits of XYZ contained in the timing reference signal SAV (bits scrambled with the values thereof varied among the channels CH1, CH3, CH5, and CH7 as described in relation to the scrambler 24) into 0s that are their original values.

Parallel digital data of 40 bits wide descrambled by the descrambler 41 in the block 38-1 is transmitted to a selector 43. In the block 38-1, inputted parallel digital data of 50 bits wide (data of the horizontal blanking period on the channel CH1 having been 8B/10B encoded) is transmitted to an 8B/10B decoder 42. The 8B/10B decoder 42 8-bit-to-10-bit decodes the parallel digital data. The parallel digital data of 40 bits wide 8-bit-to-10-bit decoded by the 8B/10B decoder 42 is transmitted to the selector 43.

The selector 43 alternately selects parallel digital data sent from the descrambler 41 and parallel digital data sent from the 8B/10B decoder 42, constructs parallel digital data of 40 bits wide into which all data items on each horizontal line are integrated, and transmits the parallel digital data of 40 bits wide to a FIFO memory 44.

In the blocks 38-3, 38-5, and 38-7, neither the 8B/10B decoder 42 nor the selector 43 is included because parallel digital data of 50 bits wide is not inputted. Parallel digital data of 40 bits wide descrambled by the descrambler 41 is transmitted to the FIFO memory 44 as it is.

Parallel digital data of 40 bits wide sent to the FIFO memory 44 is written in the FIFO memory 44 responsively to the clock of 83.5312 MHz sent from the PLL 34 (FIG. 17). Thereafter, the parallel digital data is read from the FIFO memory 44 responsively to the clock of 37.125 MHz sent from the PLL 34 while having the width of 40 bits left intact, and then transmitted to a FIFO memory 45.

Parallel digital data of 40 bits wide sent to the FIFO memory 45 is written in the FIFO memory 45 responsively to the clock of 37.125 MHz sent from the PLL 34 (FIG. 17). Thereafter, the parallel digital data is read from the FIFO memory 45 as parallel digital data of 20 bits wide (data of one sample on the link LinkA shown in FIG. 7) responsively to the clock of 74.25 MHz sent from the PLL 34, and transmitted to a parallel-to-serial (P/S) converter 46.

The P/S converter 46 parallel-to-serial converts the parallel digital data into an HD-SDI signal permitting a bit rate of 1.485 Gbps so as to reproduce the HD-SDI signal. The HD-SDI signals on the channels CH1, CH3, CH5, and CH7 reproduced by the blocks 38-1, 38-3, 38-5, and 38-7 are transmitted to a 4 k×2 k reproduction unit 39 shown in FIG. 18.

Next, the blocks 38-2, 38-4, 38-6, and 38-8 for the link LinkB will be described below. In the blocks 38-2, 38-4, 38-6, and 38-8, inputted parallel digital data items of 40 bits wide on the channels CH2, CH4, CH6, and CH8 (sets of data items of a timing reference signal SAV, an active line, a timing reference signal EAV, a line number LN, and an error detection code CRC that have undergone 8B/10B encoding) are transmitted to respective 8B/10B decoders 47.

The 8B/10B decoder 47 8-bit-to-10-bit decodes the parallel digital data. The parallel digital data of 32 bits wide 8-bit-to-10-bit decoded by the 8B/10B decoder 47 is transmitted to the FIFO memory 44.

Parallel digital data of 32 bits wide sent to the FIFO memory 44 is written in the FIFO memory 44 responsively to the clock of 83.5312 MHz sent from the PLL 34 (FIG. 17). Thereafter, the parallel digital data is read from the FIFO memory 44 responsively to the clock of 37.125 MHz sent from the PLL 34 while having the width of 32 bits left intact, and then transmitted to the FIFO memory 45.

Parallel digital data of 32 bits wide sent to the FIFO memory 45 is written in the FIFO memory 45 responsively to the clock of 37.125 MHz sent from the PLL 34 (FIG. 17). Thereafter, the parallel digital data is read from the FIFO memory 45 as parallel digital data of 16 bits wide (R, G, and B bits of one sample on the link LinkB shown in FIG. 7) responsively to the clock of 74.25 MHz sent from the PLL 34, and then transmitted to a sample data constructor 48.

The sample data constructor 48 constructs 20-bit data items of samples on the link LinkB to each of which four bits of bit numbers 0, 1, 8, and 9 out of R'G'B'n:0-1 shown in FIG. 7 are appended. The thus constructed parallel digital data of 20 bits wide is transmitted from the sample data constructor 48 to the P/S converter 46.

The P/S converter 46 parallel-to-serial converts the parallel digital data into an HD-SDI signal permitting a bit rate of 1.485 Gbps, and thus reproduces the HD-SDI signal. The HD-SDI signals on the channels CH2, CH4, CH6, and CH8 reproduced by the respective blocks 38-2, 38-4, 38-6, and 38-8 are transmitted to the 4 k×2 k reproduction unit 39 shown in FIG. 18.

The 4 k×2 k reproduction unit 39 shown in FIG. 18 performs processing, which is a reverse of the processing (FIG. 6) of the mapping unit 11 (FIG. 2) of the broadcasting camera 1, on the HD-SDI signals on the channels CH1 to CH8 (links LinkA and LinkB) sent from the S/P-scrambling-8B/10B unit 38. The 4 k×2 k reproduction unit 39 is a circuit that reproduces a 3840×2160/24P,25P,30P/4:4:4,4:2:2,4:2:0/10,12-bit signal through this processing.

The 4 k×2 k reproduction unit 39 of this example extracts one by one pixel samples allocated to active periods of first, second, third, and fourth sub-images received by the S/P conversion-multi-channel data construction unit 32. The 4 k×2 k reproduction unit 39 sequentially reallocates the pixel samples to one frame of a video signal, and restores thinned out pixels from the allocated samples.

At this time, the 4 k×2 k reproduction unit 39 alternately allocates samples, which are mapped to the first and second sub-images, onto odd-numbered lines. Likewise, the 4 k×2 k reproduction unit 39 alternately allocates samples, which are mapped to the third and fourth sub-images, onto even-numbered lines. The 4 k×2 k reproduction unit 39 then uses samples, which are allocated to each line, to restore thinned out pixels adjoining the samples.

A 3840×2160/24P,25P,30P/4:4:4,4:2:2,4:2:0/10,12-bit signal reproduced by the 4 k×2 k reproduction unit 39 is outputted from the CCU 2, and transmitted to, for example, a VTR or the like (not shown).

Not only a 3840×2160/24P,25P,30P/4:4:4,4:2:2,4:2:0/10, 12-bit signal is transmitted from each broadcasting camera 1 to the CCU 2 but also return video (a video signal to be used to display a picture being picked up by another broadcasting camera 1) is transmitted from the CCU 2 to each broadcasting camera 1 over the optical fiber cable 3. The return video is produced using a known technology (for example, after HD-SDI signals on two channels are 8-bit-to-10-bit encoded, the resultant signals are multiplexed and converted into serial digital data). A description of circuitry for the production will be omitted.

In this example, the signal receiving device 6 performs signal processing assigned to a side of receiving serial digital data produced by the signal transmitting device 5. According to the signal receiving device 6 and signal receiving method, parallel digital data is produced from serial digital data permitting a bit rate of 10.692 Gbps, and the parallel digital data is separated into data items on respective channels classified into the links LinkA and LinkB.

Separated data items on the link LinkA are subjected to self-synchronous descrambling. All the values in the register in each of the descramblers are set to 0s immediately previously to a timing reference signal SAV, and decoding is initiated. In addition, data of at least several bits long succeeding an error detection code CRC is subjected to self-synchronous descrambling. Therefore, only data items of the timing reference signal SAV, an active line, a timing reference signal EAV, a line number LN, and the error detection code CRC are subjected to self-synchronous scrambling, but data of a horizontal blanking period is not subjected to self-synchronous scrambling. Nevertheless, calculation is accurately performed in consideration of carrying by the descrambler, which is a multiplication circuit, in order to reproduce original data.

As for the separated data items on the link LinkB, data items of samples on the link LinkB are constructed from 8-bit-to-10-bit decoded R, G, and B bits. Parallel digital data on the link LinkA subjected to self-synchronous descrambling and parallel digital data on the link LinkB having samples thereof constructed are parallel-to-serial converted, whereby mapped HD-SDI signals on the channels CH1 to CH8 are reproduced.

As mentioned above, in the broadcasting camera 1 that is a transmitting side, all the values in the register in each of the scramblers 24 are set to 0s immediately previously to the timing reference signal SAV, encoding is carried out, and data of ten bits long succeeding the error detection code CRC is outputted. In the CCU 2 that is a receiving side, all the values in the register in each of the descramblers 41 are set to 0s immediately previously to the timing reference signal SAV, decoding is initiated, and data of ten bits long succeeding the error detection code CRC is descrambled. Therefore, although data of the horizontal blanking period subjected to self-synchronous scrambling is not transmitted, the CCU 2 that is the receiving side can accurately reproduce original data.

On both the links LinkA and LinkB, self-synchronous scrambling or 8B/10B encoding is carried out in units of two samples. Therefore, the resultant data can be compatible with forty high-order bits of a content ID of fifty bits long specified in the SMPTE435.

Scrambling is performed by varying the values of two low-order bits of XYZ in the timing reference signal SAV among the channels belonging to the link LinkA. Therefore, even when a 3840×2160/24P,25P,30P/4:4:4,4:2:2,4:2:0/10, 12-bit signal is a flat signal (the R, G, and B values are nearly the same values over an entire screen), an incident that data values become uniform between the channels CH1, CH3, CH5, and CH7 and the channels CH2, CH4, CH6, and CH8 can be avoided. Therefore, occurrence of EMI (Electro-Magnetic Interference) can be prevented.

Since 8B/10B-encoded data is inserted to data, which has undergone self-synchronous scrambling, in units of 40 bits or the values in the register in each of the descramblers 41 are set to 0s immediately previously to the timing reference signal SAV, occurrence of a pathological pattern can be prevented.

In the aforesaid camera transmission system relating to the first embodiment, a 3840×2160/24P,25P,30P/4:4:4,4:2:2,4:2:0/10,12-bit signal is mapped into HD-SDI signals on the channels CH1 to CH8 (links LinkA and LinkB). Thus, the 3840×2160/24P,25P,30P/4:4:4,4:2:2,4:2:0/10,12-bit signal is converted into serial digital data permitting a bit rate of 10.692 Gbps and transmitted. This is advantageous in that a 4 k signal can be transmitted through multiple channels supported by a conventionally employed 10.692 Gb/s serial interface.

A 4 k×8 k signal representing one frame is extracted in units of two samples and mapped into sub-images. Samples mapped into the sub-images are samples constituting one frame that is an original image. Since the sub-images are independently acquired from data of only one channel among data transmitted through multiple channels, a picture on an entire screen can be viewed on an existing HD monitor or a waveform monitor, or an 8 k signal can be observed on a 4 k monitor or the like. This is advantageous in that an existing HD monitor can be used as a receiving side and it is effective for analysis of a defect in video equipment or the optical fiber cable 3 or the like which is used for transmission.

In the aforesaid first embodiment, a signal is thinned in units of two samples. For example, a 3840/60P signal may presumably be changed to 3840/60I signals on two channels through line-by-line thinning, or the 3840/60P signal may presumably be changed to 3840/30P signals on two channels through frame-by-frame thinning. However, similarly to the aforesaid first embodiment, when a signal is mapped in units of two samples into sub-images, an amount of data to be preserved and allocated is small. This is advantageous because a delay time occurring when a signal is transmitted from the broadcasting camera 1 to the CCU 2 is diminished. Performing signal processing that diminishes the delay time has a quite significant meaning for a professional-use camera system requested to carry out signal processing or signal transmission in real time.

Next, an example of actions of a mapping unit 11 included in the second embodiment of the present invention will be described with reference to FIG. 19.

Figure 19:
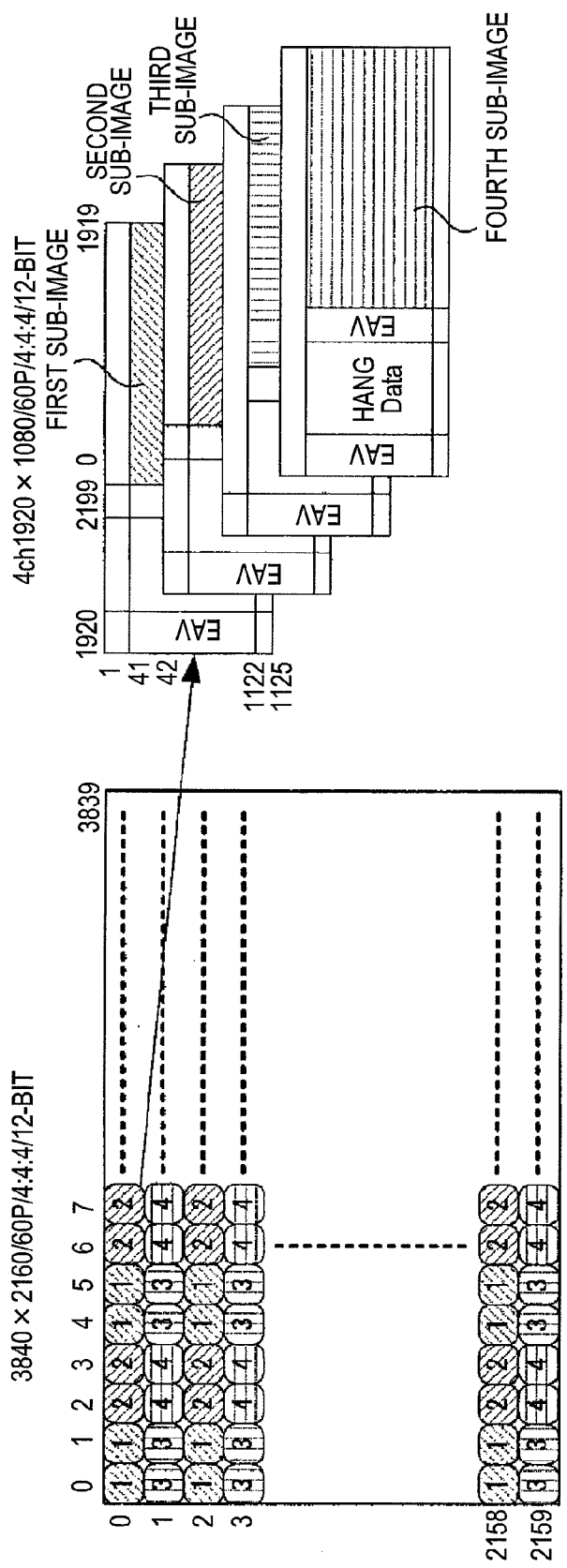
FIG. 19 is an explanatory diagram showing an example in which samples included in a frame of a 4 k×2 k signal are mapped into first to fourth sub-images.

FIG. 19 is an explanatory diagram showing an example in which samples constituting one frame of a 4 k×2 k signal are mapped into first to fourth sub-images by the mapping unit 11.

In the present embodiment, the mapping unit 11 characteristically maps a 3840×2160/50P,60P/4:4:4,4:2:2,4:2:0/10, 12-bit signal into the first to fourth sub-images. The other components are identical to those of the first embodiment. An iterative description will be omitted. As for the processing of a signal receiving device 6 included in a CCU 2, since it is identical to that in the first embodiment, an iterative description will be omitted.

A broadcasting camera 1 in this example is a camera including a signal transmitting device 5 that produces a 3840× 2160/50P,60P/4:4:4,4:2:2,4:2:0/10,12-bit signal, which is equivalent to a signal specified in the UHDTV1, as a 4 k×2 k signal (an untra-high-definition signal representing 4 k samples×2 k lines), and transmits HD-SDI signals into which the signal is mapped according to a predetermined method. A signal receiving device 6 included in the CCU 2 in this example can reproduce an image of the 3840×2160/50P,60P/ 4:4:4,4:2:2,4:2:0/10,12-bit signal, on the basis of the HD-SDI signals received from the broadcasting camera 1.

The mapping unit 11 in this example is a circuit that maps a 3840×2160/50P,60P/4:4:4,4:2:2,4:2:0/10,12-bit signal into HD-SDI signals on eight channels CH1 to CH8 (channels CH1, CH3, CH5, and CH7 classified into the link LinkA and channels CH2, CH4, CH6, and CH8 classified into the link LinkB), which permit a bit rate of 1.485 Gbps, in conformity with the SMPTE435. Even in the present embodiment, similarly to the aforesaid first embodiment, the mapping unit 11 maps an image signal, which is allocated to a frame, into first to fourth sub-images.

Referring to FIG. 19, a concrete example of mapping will be described on the assumption that the position of each of samples included in a frame of a 4 k×2 k signal and in first to fourth sub-images is expressed as (sample number, line number).

For example, two samples at (0,0) and (1,0) in a frame of a 4 k×2 k signal are mapped to (0,42) and (1,42) in the first sub-image.

Two samples at (2,0) and (3,0) in the frame of the 4 k×2 k signal are mapped to (0,42) and (1,42) in the second sub-image.

Two samples at (0,1) and (1,1) in the frame of the 4 k×2 k signal are mapped to (0,42) and (1,42) in the third sub-image.

Two samples at (2,1) and (3,1) in the frame of the 4 k×2 k signal are mapped to (0,42) and (1,42) in the fourth sub-image.

Likewise, samples included in the frame of the 4 k×2 k signal are mapped to the first to fourth sub-images.

As mentioned above, the mapping unit 11 thins a 3840× 2160/50P,60P/4:4:4,4:2:2,4:2:0/10,12-bit signal in units of two samples in a line direction, and multiplexes the samples to active periods of HD-SDI signals. After mapping samples into 1920×1080/50P,60P/4:4:4, 4:2:2,4:2:0/10,12-bit signals on four channels, the mapping unit 11 maps the signals into the links LinkA and LinkB (see FIG. 6). The broadcasting camera 1 can transmit the signals using a 4-channel Quad link in conformity with the existing HD-SDI.

Since it is equivalent to "(a Quad link 292×2 channels) shown in FIG. 6×2 channels", the signal can be transmitted through two channels of 10 Gbps. In case signals on two channels of 10G are transmitted over one optical fiber, a 1.3 μm/1.55 μm two-wavelength multiplexing technology or a CWDM/DWDM wavelength multiplexing technology can be employed.

According to the foregoing second embodiment, since a 3840×2160/50P,60P/4:4:4,4:2:2,4:2:0/10,12-bit signal is mapped into HD-SDI signals on channels CH1 to CH8 (links LinkA and LinkB), the signal can be converted into serial digital data permitting a bit rate of 10.692 Gbps and transmitted. This is advantageous in that multiple channels supported by a conventionally employed 10.692 Gb/s serial interface can be used for transmission even in a case where a frame interval is 50P,60P.

Next, referring to FIG. 20, an example of actions of a mapping unit 11 included in the third embodiment of the present invention will be described below.

Figure 20:
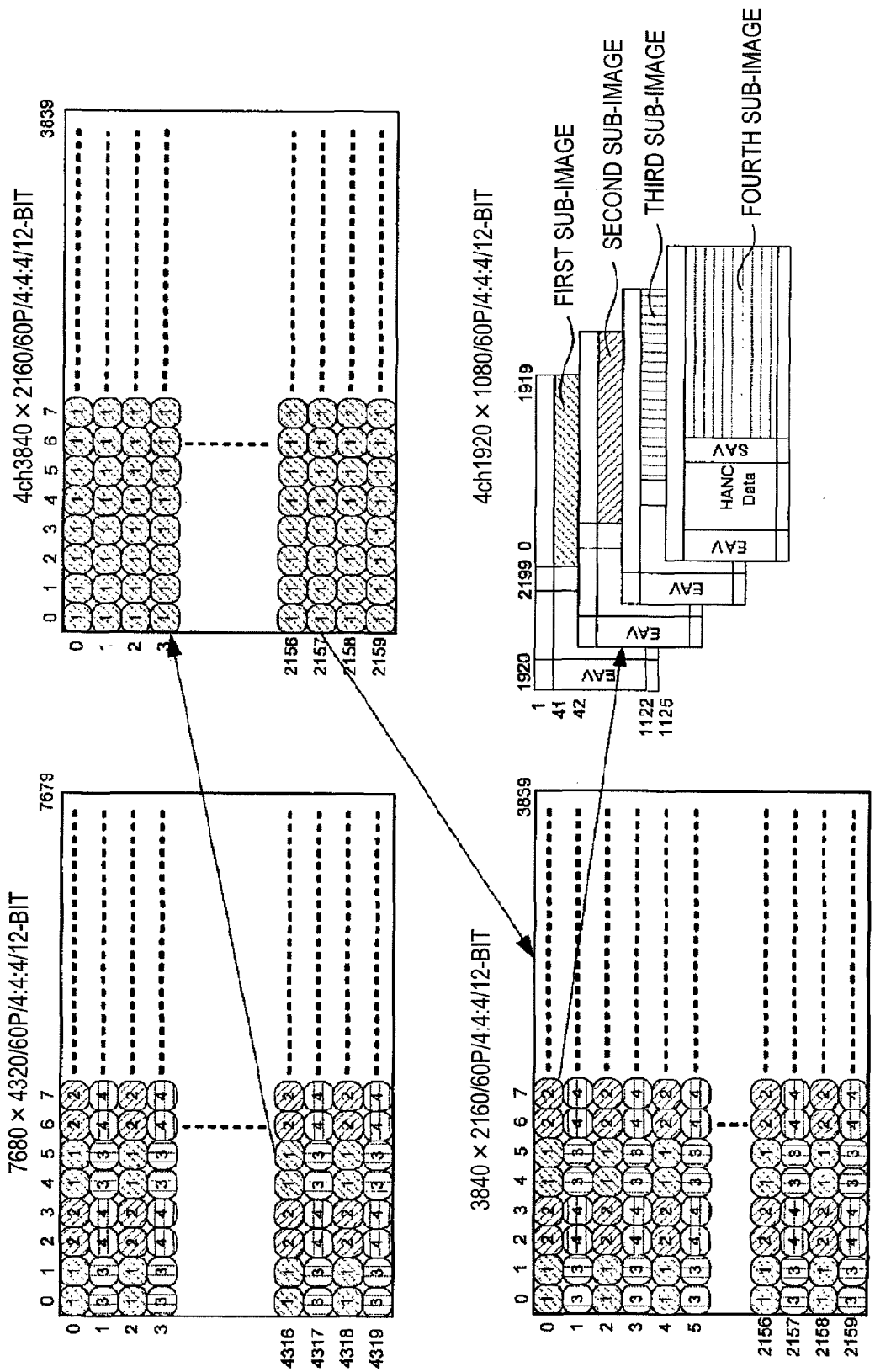
FIG. 20 is an explanatory diagram showing an example in which samples included in a frame of a 8 k×4 k signal are mapped into one frame of a 4-channel 4 k×2 k signal.

FIG. 20 is an explanatory diagram showing an example in which samples constituting one frame of a 8 k×4 k signal are mapped into first to fourth sub-images by the mapping unit 11.

In the present embodiment, the mapping unit 11 maps a 7680×4320/50P,60P/4:4:4,4:2:2,4:2:0/10,12-bit signal into first to fourth sub-images. The other components are identical to those of the first embodiment. Therefore, an iterative description will be omitted.

A broadcasting camera 1 in this example is a camera including a signal transmitting device 5 that produces a first frame, which is specified with a 7680×4320/50P,60P/4:4:4, 4:2:2,4:2:0/10,12-bit signal equivalent to a UHDTV2 signal, as a frame of a 8 k×4 k signal (an ultra-high-definition signal representing 8 k samples×4 k lines), and transmits HD-SDI signals into which the signal is mapped according to a predetermined method. A signal receiving device 6 included in a CCU 2 in this example can reproduce an image of the 7680× 4320/50P,60P/4:4:4,4:2:2,4:2:0/10,12-bit signal on the basis of the HD-SD signals received from the broadcasting camera 1.

The mapping unit 11 in this example is a circuit that maps a 7680×4320/50P,60P/4:4:4,4:2:2,4:2:0/10,12-bit signal into HD-SDI signals on eight channels CH1 to CH8 (channels CH1, CH3, CH5, and CH7 classified into the link LInkA and channels CH2, CH4, CH6, and CH8 classified into the link LinkB), which permit a bit rate of 1.485 Gbps, in conformity with the SMPTE435.

The 7680×4320/50P,60P/4:4:4,4:2:2,4:2:0/10,12-bit signal is thinned in units of two samples in a line direction, and samples are mapped to the second frame of four channels defined with 3840×2160/50P,60P/4:4:4,4:2:2,4:2:0/10,12-bit signals as shown in FIG. 6.

The 3840×2160/50P,60P/4:4:4,4:2:2,4:2:0/10,12-bit signals on four channels are further thinned in units of two samples in the line direction, and samples are mapped to active periods of respective HD-SDI signals. Thus, as shown in FIG. 7, the signals are mapped into 1920×1080/50P,60P/ 4:4:4,4:2:2,4:2:0/10,12-bit signals on four channels, so that the resultant signals can be transmitted through over "a Quad-link 292 conformable to the existing HD-SDI×four channels".

Therefore, the 7680×4320/50P,60P/4:4:4,4:2:2,4:2:0/10, 12-bit signal can be mapped to sixteen channels of Quad links. Since "a Quad link 292×two channels" can transmit data at 10 Gbps, the data can be transmitted through at eight channels of 10 Gbps.

When signals on eight channels of 10 Gbps are transmitted over one optical fiber, a CWDM/DWDM (Coarse Wavelength Division Multiplexing/Dense Wavelength Division Multiplexing) wavelength multiplexing technology can be employed.

According to the foregoing third embodiment, when a 7680×4320/50P,60P/4:4:4,4:2:2,4:2:0/10,12-bit signal is mapped into HD-SDI signals on channels CH1 to CH8 (links LinkA and LinkB), the signal can be converted into serial digital data permitting a bit rate of 10.692 Gbps and transmitted. This is advantageous in that an 8 k signal that is a new-generation video signal deliberated by the ITU or SMPTE can be transmitted using multiple channels supported by a conventionally employed 10.692 Gb/s serial interface.

Next, referring to FIG. 21, an example of actions of a mapping unit 11 included in the fourth embodiment of the present invention will be described below.

Figure 21:
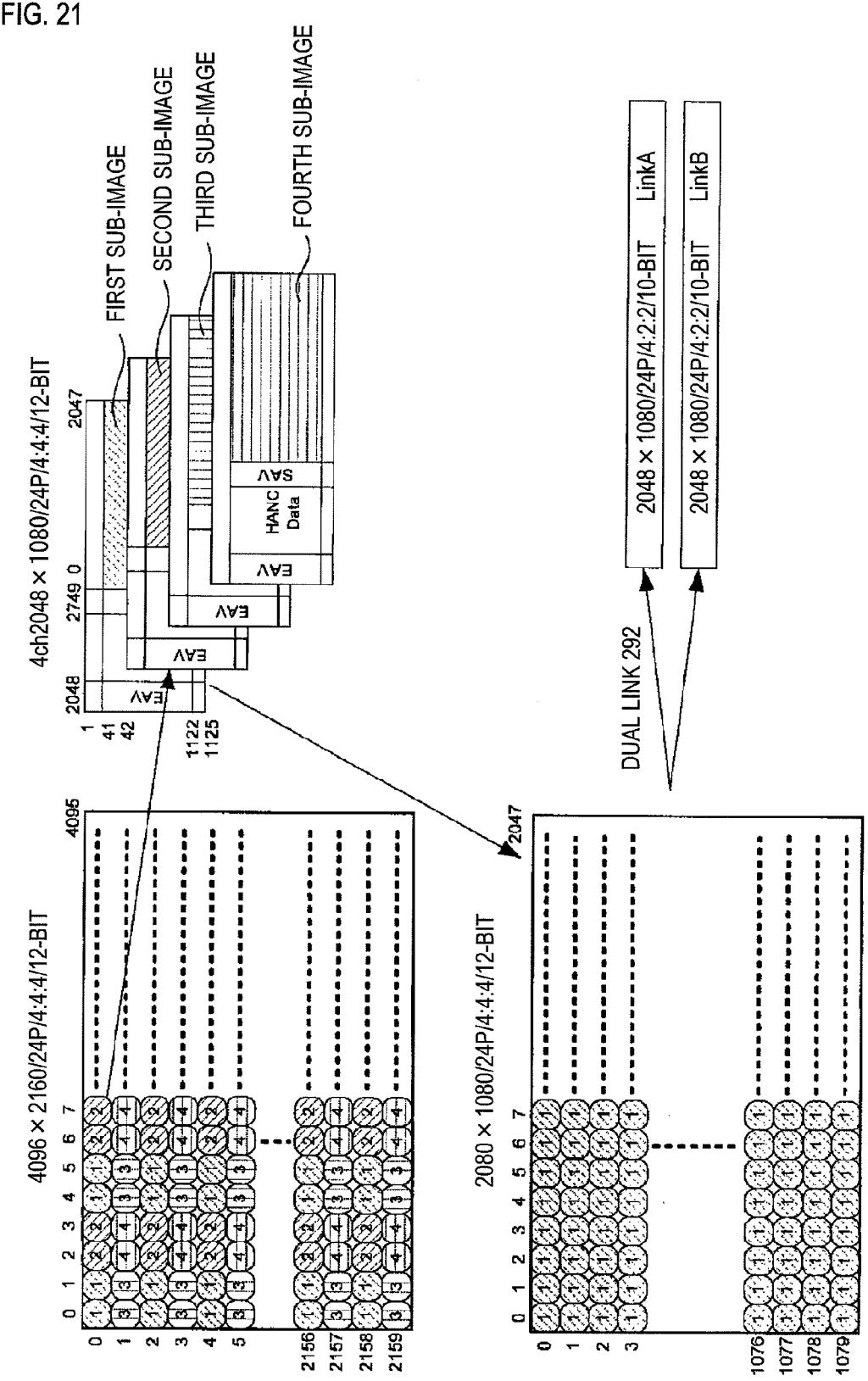
FIG. 21 is an explanatory diagram showing an example in which samples included in a frame of a 4 k×2 k signal are mapped into first to fourth sub-images.

FIG. 21 is an explanatory diagram showing an example in which samples constituting one frame of a 4 k×2 k signal are mapped into first to fourth sub-images by the mapping unit 11.

In the present embodiment, the mapping unit 11 maps a 4096×2160/24P/4:4:4/12-bit signal into first to fourth sub-images. The other components are identical to those of the first embodiment. Therefore, an iterative description will be omitted. In addition, since processing of a signal receiving device 6 included in a CCU 2 is identical to that in the first embodiment, an iterative description will be omitted.

A broadcasting camera 1 in this example is a camera including a signal transmitting device 5 that produces a 4096× 2160/24P/4:4:4/12-bit signal as a 4 k×2 k signal (an ultra-high-definition signal representing 4 k samples×2 k lines), and transmits HD-SDI signals into which the signal is mapped according to a predetermined method. The signal receiving device 6 included in the CCU 2 in this example can reproduce an image of the 4096×2160/24P/4:4:4/12-bit signal as the 4 k×2 k signal (an ultra-high-definition signal representing 4 k samples×2 k lines) on the basis of the HD-SDI signals received from the broadcasting camera 1.

The mapping unit 11 in this example is a circuit that maps a 4096×2160/24P/4:4:4/12-bit signal into HD-SDI signals on eight channels CH1 to CH8 (channels CH1, CH3, CH5, and CH7 classified into a link LinkA and channels CH2, CH4, CH6, and CH8 classified into a link LinkB), which permit a bit rate of 1.485 Gbps, in conformity with the SMPTE435. Even in the present embodiment, similarly to the aforesaid first embodiment, the mapping unit 11 maps an image signal, which is allocated to a frame, into first to fourth sub-images.

Referring to FIG. 21, a concrete example will be described on the assumption that each of positions of samples contained in one frame of a 4 k×2 k signal and first to fourth sub-images is expressed as (sample number, line number).

For example, two samples at (0,0) and (1,0) in one frame of a 4 k×2 k signal are mapped into (0,42) and (1,42) respectively in the first sub-image.

Two samples at (2,0) and (3,0) in the frame of the 4 k×2 k signal are mapped into (0,42) and (1,42) respectively in the second sub-image.

Two samples at (0,1) and (1,1) in the frame of the 4 k×2 k signal are mapped into (0,42) and (1,42) respectively in the third sub-image.

Two samples at (2,1) and (3,1) in the frame of the 4 k×2 k signal are mapped into (0,42) and (1,42) respectively in the fourth sub-image.

Likewise, the other samples contained in the frame of the 4 k×2 k signal are similarly mapped into the first to fourth sub-images.

As mentioned above, the mapping unit 11 thins a 4096× 2160/24P/4:4:4/12-bit signal in units of two samples in a line direction, and multiplexes the samples to active periods of HD-SDI signals. After mapping samples into 2048×1080/ 24P/4:4:4/12-bit signals on four channels, the mapping unit 11 maps the signals into 2048×1080/24P/4:2:2/10-bit signals on the links LinkA and LinkB. The broadcasting camera 1 can transmit the signals using eight channels in conformity with the existing HD-SDI.

According to the foregoing fourth embodiment, since a 4096×2160/24P/4:4:4/12-bit signal is mapped into HD-SDI signals on channels CH1 to CH8 (links LinkA and LinkB), the signal can be converted into serial digital data permitting a bit rate of 10.692 Gbps and transmitted. This is advantageous in that multiple channels supported by a conventionally employed 10.692 Gb/s serial interface can be used for transmission even in a case where a frame interval is 24P.

Incidentally, in the aforesaid examples, the present invention is applied to a camera transmission system. A signal formatted in any of other various modes may be transmitted. The present invention can be applied to a case where various signals are transmitted.

DESCRIPTION OF REFERENCE NUMERALS

1: broadcasting camera, 2: CCU (camera control unit), 3: optical fiber cable, 5: signal transmitting device, 6: signal receiving device, 11: mapping unit, 12: S/P-scrambling-8B/10B unit, 38-1 to 38-8: blocks of S/P-scrambling-8B/10B unit. 13: PLL, 14: multiplexing unit, 15: data length conversion unit, 16: FIFO memory, 17: multi-channel data construction unit, 18: multiplexing-P/S conversion unit, 19: photoelectric conversion unit, 21: S/P (serial-to-parallel) converter, 22: TRS detector, 23: FIFO memory, 24: scrambler, 25: 8B/10B encoder, 26: FIFO memory, 27: FIFO memory, 28: extractor, 29: K28.5 inserter, 30: 8B/10B encoder, 31: photoelectric conversion unit, 32: S/P conversion-multi-channel data construction unit, 33: multiplexing unit, 34: PLL, 35: FIFO memory, 36: data length conversion unit, 37: separation unit, 38: descrambling-8B/10B-P/S unit, 38-1 to 38-8: blocks of descrambling-8B/10B-P/S unit, 39: 4 k×2 k reproduction unit, 42: descrambler, 42: 8B/10B decoder, 43: selector, 44: FIFO memory, 45: FIFO memory, 46: P/S (parallel-to-serial) converter, 47: 8B/10B decoder, 48: sample data constructor

The invention claimed is:

1. A signal transmitting device that transmits, during a broadcast, an input image signal in which a number of pixels of one frame is larger than the number of pixels specified in a HD format, comprising:
  a mapping unit that extracts a plurality of samples from each frame of the input image signal in units of two adjoining pixels, fetches the samples in equal order frame by frame, maps the samples into active periods of first, second, third, and fourth sub-images conformable to the HD format, separates each of the mapped first, second, third, and fourth sub-images into a first-link transmission channel and a second-link transmission channel, and therein maps the sub-images into eight channels;
  a parallel-to-serial conversion unit that serially converts the mapped first, second, third, and fourth sub-images; and
  an output unit that outputs, during the broadcast, serial digital data which is serially converted by the parallel-to-serial conversion unit.

2. The signal transmitting device according to claim 1, wherein the mapping unit extracts two pixels adjoining on the same line, maps each of two pixels on odd-numbered lines in each frame alternately to the first sub-image and second sub-image, and maps each of two pixels on even-numbered lines in each frame alternately to the third sub-image and fourth sub-image.

3. The signal transmitting device according to claim 1, wherein the HD format includes HD-SDI.

4. A signal transmitting method of transmitting, during a broadcast, an input image signal in which a number of pixels of one frame is larger than the number of pixels specified in a HD format, comprising:
  mapping processing of extracting a plurality of samples from each frame of the input image signal in units of two adjoining pixels, fetching the samples in equal order frame by frame, mapping the samples into active periods of first, second, third, and fourth sub-images conformable to the HD format, separating each of the mapped first, second, third, and fourth sub-images into a first-link transmission channel and a second-link transmission, channel, and therein mapping the sub-images into eight channels;
  parallel-to-serial conversion processing of serially converting each of the first, second, third, and fourth sub-images that are mapped through the mapping processing; and
  output processing of outputting, during the broadcast, serial digital data which is serially converted through the parallel-to-serial conversion processing.

5. The signal transmitting method according to claim 4, wherein the HD format includes HD-SDI.

6. A signal receiving device that receives, during a broadcast, an image signal in which a number of pixels of one frame is larger than the number of pixels specified in a HD format, comprising:
  a receiving unit that receives, during the broadcast, first, second, third, and fourth sub-images into which the image signal is mapped and each of which is divided into a first-link channel and a second-link channel; and
  a reproduction unit that extracts one by one pixel samples allocated to active periods of first, second, third, and fourth sub-images received by the receiving unit, sequentially reallocates the pixel samples to one frame of the image signal, and restores the pixels from the allocated pixel samples for the broadcast, wherein each pixel sample is a group of two adjoining pixels on a line.

7. The signal receiving device according to claim 6, wherein the reproduction unit alternately allocates predetermined pixel samples, which are mapped to the first and second sub-images, onto odd-numbered lines, alternately allocates predetermined pixel samples, which are mapped to the third and fourth sub-images, onto even-numbered lines, and uses the pixel samples, which are allocated to each line, to restore adjoining pixels in the pixel samples.

8. The signal receiving device according to claim 6, wherein the HD format includes HD-SDI.

9. A signal receiving method of receiving, during a broadcast, an image signal in which a number of pixels of one frame is larger than the number of pixels specified in a HD format, comprising:
  receiving processing of receiving, during the broadcast, first, second, third, and fourth sub-images into which the image signal is mapped and each of which is divided into a first-link channel and a second-link channel; and
  reproduction processing of extracting one by one pixel samples allocated to active periods of first, second, third, and fourth sub-images received by the receiving unit, sequentially reallocating the pixel samples to one frame of the image signal, and restoring adjoining pixels from the allocated pixel samples for the broadcast, wherein each pixel sample is a group of two adjoining pixels.

10. The signal receiving method according to claim 9, wherein the HD format includes HD-SDI.

* * * * *